(12) United States Patent
Azuma et al.

(10) Patent No.: US 10,407,760 B2
(45) Date of Patent: Sep. 10, 2019

(54) HOT-DIP GALVANIZED STEEL SHEET AND MANUFACTURING METHOD THEREOF

(71) Applicant: Nippon Steel & Sumitomo Metal Corporation, Tokyo (JP)

(72) Inventors: Masafumi Azuma, Tokyo (JP); Chisato Wakabayashi, Tokyo (JP); Takayuki Nozaki, Tokyo (JP); Manabu Takahashi, Tokyo (JP); Nobuhiro Fujita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 700 days.

(21) Appl. No.: 14/347,067

(22) PCT Filed: Sep. 28, 2012

(86) PCT No.: PCT/JP2012/075215
§ 371 (c)(1),
(2) Date: Mar. 25, 2014

(87) PCT Pub. No.: WO2013/047820
PCT Pub. Date: Apr. 4, 2013

(65) Prior Publication Data
US 2014/0234657 A1 Aug. 21, 2014

(30) Foreign Application Priority Data
Sep. 30, 2011 (JP) ................................. 2011-217108
Sep. 30, 2011 (JP) ................................. 2011-218046

(51) Int. Cl.
*B32B 15/01* (2006.01)
*C23C 2/26* (2006.01)
(Continued)

(52) U.S. Cl.
CPC .............. *C23C 2/02* (2013.01); *B32B 15/013* (2013.01); *C21D 8/0226* (2013.01);
(Continued)

(58) Field of Classification Search
CPC .... C22C 18/00; C22C 38/00; Y10T 42/12799
(Continued)

(56) References Cited

U.S. PATENT DOCUMENTS

2004/0202889 A1* 10/2004 Fujita ........................ C23C 2/02
428/659
2006/0269776 A1 11/2006 Tanaka et al.
(Continued)

FOREIGN PATENT DOCUMENTS

CN 1771344 5/2006
EP 1634975 3/2006
(Continued)

OTHER PUBLICATIONS

English machine translation of JP 2011-111673, JPO, accessed Feb. 6, 2016.*
(Continued)

*Primary Examiner* — Humera N Sheikh
*Assistant Examiner* — Xiaobei Wang
(74) *Attorney, Agent, or Firm* — Birch, Stewart, Kolasch & Birch, LLP

(57) ABSTRACT

A hot-dip galvanized steel sheet includes: a steel sheet; and a plated layer on a surface of the steel sheet, a microstructure contains, by volume fraction, equal to or more than 20% and equal to or less than 99% in total of one or two of martensite and bainite, a residual structure contains one or two of ferrite, residual austenite of less than 8% by volume fraction, and pearlite of equal to or less than 10% by volume fraction, tensile strength is equal to or greater than 980 MPa, the plated layer is a hot-dip galvanized layer which contains
(Continued)

oxides including one or two or more of Si, Mn, and Al, contains equal to or less than 15 mass % of Fe, and a remainder including Zn, Al, and unavoidable impurities, and when a cross section including the steel sheet and the hot-dip galvanized layer is seen in a sheet thickness direction, a projected area ratio is equal to or more than 10% and equal to or less than 90%.

16 Claims, 3 Drawing Sheets

(51) Int. Cl.

| | |
|---|---|
| C23C 2/06 | (2006.01) |
| C23C 2/40 | (2006.01) |
| C21D 8/02 | (2006.01) |
| C22C 38/02 | (2006.01) |
| C22C 38/04 | (2006.01) |
| C22C 38/12 | (2006.01) |
| C22C 38/14 | (2006.01) |
| C21D 9/46 | (2006.01) |
| C23C 2/02 | (2006.01) |
| C23C 2/28 | (2006.01) |
| C22C 18/00 | (2006.01) |
| C22C 38/00 | (2006.01) |
| C22C 38/06 | (2006.01) |

(52) U.S. Cl.
CPC ......... *C21D 8/0236* (2013.01); *C21D 8/0273* (2013.01); *C22C 18/00* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/06* (2013.01); *C23C 2/28* (2013.01); *C23C 2/40* (2013.01); *C21D 8/0278* (2013.01); *C21D 9/46* (2013.01); *C21D 2211/002* (2013.01); *C21D 2211/008* (2013.01); *Y10T 428/12799* (2015.01)

(58) Field of Classification Search
USPC ........................................................ 428/659
See application file for complete search history.

(56) References Cited

U.S. PATENT DOCUMENTS

| | | | |
|---|---|---|---|
| 2011/0139315 A1* | 6/2011 | Nakagaito | C21D 1/25 148/533 |
| 2011/0198002 A1* | 8/2011 | Nakagaito | C22C 38/02 148/533 |
| 2012/0118438 A1* | 5/2012 | Nakagaito | C21D 8/0226 148/533 |
| 2012/0328901 A1* | 12/2012 | Nonaka | C21D 8/0436 428/659 |

FOREIGN PATENT DOCUMENTS

| | | | |
|---|---|---|---|
| EP | 1980638 | 10/2008 | |
| EP | 2112247 | 10/2009 | |
| JP | 59-219473 | 12/1984 | |
| JP | 11-293383 | 10/1999 | |
| JP | 2002-018531 | 1/2002 | |
| JP | 2007-270176 | 10/2007 | |
| JP | 2008-007842 | 1/2008 | |
| JP | 2009-209451 | 9/2009 | |
| JP | 2010-106323 | 5/2010 | |
| JP | 2011-111673 | 6/2011 | |
| RU | 2005133422 | 4/2006 | |
| RU | 2323266 | 4/2008 | |
| WO | WO-2010146796 A1 * | 12/2010 | ........... C21D 8/0226 |
| WO | WO 2011/065591 | 6/2011 | |
| WO | WO2011087057 | * 7/2011 | |

OTHER PUBLICATIONS

Galvinfo, "Galvanneal—Differences from Galvanize", GalvinfoNote 1.3, Apr. 2, 2014, accessed at <http://www.galvinfo.com/ginotes/GalvInfoNote_1_3.pdf> on Jun. 16, 2016.*
English Machine Translation of Kenji JP 2007-270176, accessed Jun. 16, 2016.*
Office Action dated Apr. 16, 2015 issued in corresponding Chinese Application No. 20128004 7125.9 [with Partial English Translation].
European Search Report dated Aug. 25, 2015 issued in corresponding European Application No. 12834953.7.
Decision on Grant dated May 28, 2015 issued in corresponding Russian Application No. 2014113075 [with English Translation].
International Search Report dated Dec. 25, 2012 issued in corresponding PCT Application No. PCT/JP2012/075215 [with English Translation].
Kimura et al., "Advances in Delayed Fracture Solution", Jan. 1997, Iron and Steel Institute of Japan, pp. 115-129 [with English Translation].
Yamazaki et al., "Effect of Microstructure on Formability and Delayed Cracking of Super High Strength Cold Rolled Steel Sheet", Oct. 1992, CAMP-Iron and Steel Institute of Japan, vol. 5, No. 6, pp. 1839-1842 [with English Translation].
Hayashi et al., "Evaluation of Hydrogen Embrittlement Susceptibility for High Strength Sheet Steel", Materia, vol. 44, No. 3 (2005), pp. 254-256 [with English Translation].

* cited by examiner

HOT-DIP GALVANIZED STEEL SHEET AND MANUFACTURING METHOD THEREOF

TECHNICAL FIELD OF THE INVENTION

The present invention relates to a hot-dip galvanized steel sheet which has tensile strength (TS) of equal to or greater than 980 MPa and has excellent plating adhesion and delayed fracture resistance. The hot-dip galvanized steel sheet according to the present invention is suitable for a structural member, a reinforcing member, and a suspension member for a vehicle. The hot-dip galvanized steel sheet according to the present invention indicates a hot-dip galvanized steel sheet and a galvannealed steel sheet. Priority is claimed on Japanese Patent Application No. 2011-218046, filed on Sep. 30, 2011 and Japanese Patent Application No. 2011-217108, filed on Sep. 30, 2011, the contents of which are incorporated herein by reference.

RELATED ART

Weight saving of members of a vehicle such as a cross member or a side member are reviewed to cope with recent trends regarding reduction of fuel consumption, and high-strengthening of the steel sheets is in progress from a viewpoint of securing strength and collision safety even if a material may be thinned, that is, although steel sheets may be used. Among them, for structural members such as a bumper reinforcement or a center pillar, a steel sheet having tensile strength of 980 MPa class (having tensile strength of equal to or greater than 980 MPa) is used, and development of a steel sheet having a higher strength is desired in the future. However, when considering application of the steel sheet having tensile strength of 980 MPa class or greater to a member for a vehicle, delayed fracture resistance is required in addition to properties such as strength and workability. The delayed fracture is caused by stress applied to the steel or hydrogen embrittlement, and is a phenomenon in which fracture of a structure occurs due to diffusion and accumulation of hydrogen in a stress concentration portion of the steel used as the structure. As a phenomenon caused by the delayed fracture, there is, for example, a phenomenon in which a member such as a pre-stressed concrete steel wire (PC steel wire) or a bolt used in a state where high stress is operated, suddenly fractures.

In the related art, a problem of a steel sheet with respect to hydrogen embrittlement was slight because, (1) although hydrogen enters, the hydrogen is released in a short time since the sheet thickness is small, and (2) a steel sheet having tensile strength of equal to or greater than 900 MPa is substantially not used to prioritize workability. However, as rapid application of a high-strength steel sheet is required, it is required to develop a high-strength steel sheet having excellent hydrogen embrittlement resistance.

It is found that the delayed fracture has a close relationship with hydrogen which enters the steel from an environment. As the hydrogen which enters the steel from an environment, there are various kinds of hydrogen such as hydrogen contained in an atmosphere or hydrogen generated under a corrosive environment. In all cases, when the hydrogen enters a steel, this may cause the delayed fracture. Accordingly, regarding a usage environment of the steel, it is preferable to use the steel sheet in an environment with no hydrogen. However, when considering the application of the steel to a structure or a vehicle, since the steel is used outdoors, the entering of the hydrogen is not avoidable.

As the stress acting on the steel used as the structure, there is stress applied to the structure, or residual stress which is some of the stress generated when the structure is formed remaining inside of the steel. In particular, in a structure such as the steel sheet for a vehicle which is used as a member after being formed, the residual stress is a significant problem, compared to a plate or bar steel which is used as it is substantially without deformation with respect to a product such as a bolt or a plate. Accordingly, when forming the steel sheet having the problem of delayed fracture, it is desirable to use a method of forming a steel sheet such that no residual stress remains therein.

For example, Patent Document 1 discloses a hot press forming method of a metal sheet, including once heating a steel sheet at a high temperature to perform processing, and then performing quenching of the steel sheet using a die to realize high strengthening. In this method, a steel is processed at a high temperature. Accordingly, dislocation introduced at the time of processing which causes the residual stress is recovered, or transformation occurs after the processing to reduce the residual stress. As a result, substantially no residual stress remains. Accordingly, as described above, hot processing is performed, the steel sheet is then strengthened with quenching, and therefore the delayed fracture resistance is improved.

However, in the technology of Patent Document 1, it is necessary to heat the steel sheet to be processed by heat treatment, and productivity is degraded. In addition, since it is necessary to install a heating furnace, it is not economical.

In addition, in a mechanical process such as cutting or punching, since the residual stress is on a cut surface, this may cause delayed fracture. Accordingly, when processing the high-strength steel sheet having tensile strength of equal to or greater than 980 MPa class, the generation of residual stress is avoided by using a method of using a laser for cutting in which a direct mechanical process is not performed. However, laser cutting is expensive, compared to shear cutting or punching.

Regarding the problems, in fields of steel bars or rod steel, and a steel plate, a steel capable of avoiding delayed fracture has been developed by improving hydrogen embrittlement resistance. For example, Non-Patent Document 1 discloses a high-strength bolt obtained by performing quenching of a steel with an austenite single-phase at a high temperature to set the steel to have a martensite single-phrase structure, and then performing a tempering treatment, to coherently precipitate a fine precipitate of an additive element such as Cr, Mo, or V showing resistance to temper softening into the martensite, and to improve hydrogen embrittlement resistance of the steel. In this high-strength bolt, the hydrogen which enters the steel is suppressed diffusing and concentrating at a part which is a delayed fracture origin at which stress is concentrated, using a phenomenon which the hydrogen that enters the steel is trapped around VC or the like, which coherently precipitate into the martensite. A steel sheet having high strength and excellent delayed fracture resistance has been developed in the related art, using such a mechanism.

The improvement of the delayed fracture resistance using a trap site of hydrogen such as VC or the like is realized by coherent precipitation of these precipitates into the martensite structure. Accordingly, it is essential to coherently precipitate such precipitates into the structure. However, the precipitation of such precipitates results in a problem in manufacturability since it is necessary to perform a precipitation heat treatment for several hours or longer. That is, in the steel sheet manufactured using general manufacturing equipment of the steel sheet such as continuous annealing equipment or continuous galvanizing equipment, since microstructure control is performed for a short time, such as approximately several tens of minutes, it is difficult to obtain an effect of improving the delayed fracture resistance with the precipitates.

In addition, in a case of using the precipitates precipitated in a hot rolling process, although the precipitates are precipitated in the hot rolling process, the steel sheet is processed at the time of cold rolling after that, and recrystallization is developed at the time of continuous annealing, and accordingly, an orientation relationship between the precipitates and the ferrite and the martensite which are a parent phase is lost. That is, the precipitates turn out not to be coherent precipitates. As a result, the delayed fracture resistance of the obtained steel sheet is significantly reduced.

In general, the steel sheet structure of the high-strength steel sheet in which delayed fracture may occur is a structure having martensite as a main constituent. Since a temperature at which the martensite structure is formed is a low temperature, the precipitates to be the trap sites of hydrogen such as VC and the like cannot be precipitated at a temperature range in which the martensite structure is formed. That is, in a case where the improvement of the delayed fracture resistance by the hydrogen trap of the coherent precipitates such as VC or the like is intended in the steel sheet, after forming a structure of the steel once with the continuous annealing equipment or continuous galvanizing equipment, it is necessary to additionally perform the heat treatment and to precipitate the precipitates, and therefore manufacturing costs are significantly increased. In addition, if the heat treatment is additionally performed in the structure including martensite as a main constituent, the structure is softened and the strength is decreased. Accordingly, it is difficult to use the coherent precipitates such as VC in order to improve the delayed fracture resistance with respect to the high-strength steel sheet. Further, the steel disclosed in Non-Patent Document 1 has a C content of equal to or greater than 0.4% and contains a large number of alloy elements, and accordingly workability or weldability thereof is not sufficient for a steel sheet.

Patent Document 2 discloses a steel plate in which hydrogen defects are reduced by oxides having Ti and Mg as main constituents. However, in the disclosed steel plate, the hydrogen defects generated by hydrogen trapped in the steel at the time of manufacturing are merely reduced, and hydrogen embrittlement resistance (delayed fracture resistance) is not considered at all. In addition, compatibility of high formability and hydrogen embrittlement resistance (delayed fracture resistance) required for the steel sheet is not considered at all.

Regarding the hydrogen embrittlement of the steel sheet, for example, promotion of hydrogen embrittlement caused by strain induced transformation of a residual austenite amount is reported in Non-Patent Document 2. In this document it is considered to form the steel sheet, but this document discloses a regulation of the residual austenite amount for not degrading the hydrogen embrittlement resistance. That is, this relates to a high-strength steel sheet having a specified structure and it cannot be said that this is a fundamental measure for improvement of hydrogen embrittlement resistance.

PRIOR ART DOCUMENT

Patent Document

[Patent Document 1] Japanese Unexamined Patent Application, First Publication No. 2002-18531

[Patent Document 2] Japanese Unexamined Patent Application, First Publication No. H11-293383

Non-Patent Document

[Non-Patent Document 1] New developments in delayed fracture clarification, The Iron and Steel Institute of Japan, published January 1997

[Non-Patent Document 2] CAMP-ISIJ, vol. 5, No. 6, pages 1839-1842, Yamazaki et al., October 1992, published by The Iron and Steel Institute of Japan

[Non-Patent Document 3] Materia, Japan Institute of Metals Bulletin, Volume 44, No. 3 (2005) p 254-256

DISCLOSURE OF THE INVENTION

Problems to be Solved by the Invention

The present invention has been made while taking the aforementioned problems into consideration. That is, an object of the invention is to provide a hot-dip galvanized steel sheet which has a tensile strength (TS) of equal to or greater than 980 MPa and has excellent plating adhesion and delayed fracture resistance, and a manufacturing method thereof. The hot-dip galvanized steel sheet also has formability (elongation, bendability, hole expandability) particularly suitable for a structural member, a reinforcing member, and a suspension member for a vehicle.

In a case of applying the steel sheet to the members described above, TS×EL is desirably equal to or more than 10000 MPa·% and TS×λ is desirably equal to or more than 20000 MPa·%.

In addition, in a case of applying the steel sheet to a member in which elongation is particularly required, TS×EL is desirably equal to or more than 14000 MPa·%, is more desirably equal to or more than 15000 MPa·%, and is even more desirably equal to or more than 16000 MPa·%.

Further, in a case of the steel sheet applied to a member such as a bumper reinforcement in which the bendability is particularly required, TS×λ correlated with the bendability is desirably equal to or more than 30000 MPa·%. TS×λ is more desirably equal to or more than 40000 MPa·% and even more desirably equal to or more than 50000 MPa·%.

Means for Solving the Problem

As a result of investigation, the present inventors have found that delayed fracture resistance can be improved by performing plating as will be described later on a surface of a steel sheet, as a method of improving the delayed fracture resistance without affecting a material of a steel. Specifically, the inventors have found that, by dispersing oxides containing one or more selected from Si, Mn, and Al in a plated layer, hydrogen entering the steel sheet from an environment is trapped by the oxides in the plated layer, and diffusion of the hydrogen to a stress concentration portion and delayed fracture due thereto can be delayed.

(1) A hot-dip galvanized steel sheet according to one aspect of the present invention includes: a steel sheet; and a plated layer on a surface of the steel sheet. In addition, the steel sheet contains, by mass %, C: equal to or more than 0.05% and less than 0.40%, Si: 0.5% to 3.0%. Mn: 1.5% to 3.0%, O: limited to 0.006% or less, P: limited to 0.04% or less, S: limited to 0.01% or less, Al: limited to 2.0% or less, N: limited to 0.01% or less, and the remainder including Fe and unavoidable impurities, a microstructure of the steel sheet contains, by volume fraction, equal to or more than 20% and equal to or less than 99% in total of one or two of a martensite and a bainite, a residual structure including a ferrite, and one or two of a residual austenite of less than 8% by volume fraction, and a pearlite of equal to or less than 10% by volume fraction, and a tensile strength of the steel sheet is equal to or greater than 980 MPa. The plated layer is a hot-dip galvanized layer which contains oxides containing one or two or more of Si, Mn, and Al, contains equal to or less than 15 mass % of Fe, and the remainder including Zn, Al, and unavoidable impurities, and when a cross section including the steel sheet and the hot-dip galvanized layer is seen in a sheet thickness direction, a projected area ratio which is an area ratio obtained by dividing a length of the oxides projected to an interface between the hot-dip galvanized layer and the steel sheet by a length of the interface between the hot-dip galvanized layer and the steel sheet, is equal to or more than 10% and equal to or less than 90%.

(2) A hot-dip galvanized steel sheet according to another aspect of the present invention includes: a steel sheet; and a plated layer on a surface of the steel sheet, the steel sheet contains, by mass %, C: equal to or more than 0.05% and less than 0.40%, Si: 0.5% to 3.0%, Mn: 1.5% to 3.0%, O: limited to 0.006% or less, P: limited to 0.04% or less, S: limited to 0.01% or less, Al: limited to 2.0% or less, N: limited to 0.01% or less, and the remainder including Fe and unavoidable impurities, a microstructure of the steel sheet contains, by volume fraction, equal to or more than 20% and equal to or less than 99% in total of one or two of a martensite and a bainite, a residual structure including a ferrite, and one or two of a residual austenite of less than 8% by volume fraction, and a pearlite of equal to or less than 10% by volume fraction, and a tensile strength of the steel sheet is equal to or greater than 980 MPa. The plated layer is a galvannealed layer which contains oxides including one or two or more of Si, Mn, and Al, contains equal to or more than 7 mass % and equal to or less than 15 mass % of Fe, and the remainder including Zn. Al, and unavoidable impurities, and when a cross section including the steel sheet and the galvannealed layer is seen in a sheet thickness direction, a projected area ratio which is an area ratio obtained by dividing a length of the oxides projected to an interface between the galvannealed layer and the steel sheet by a length of the interface between the galvannealed layer and the steel sheet, is equal to or more than 10% and equal to or less than 90%.

(3) In the hot-dip galvanized steel sheet according to (1) or (2), the microstructure may contain, by volume fraction, 40% to 80% of ferrite.

(4) In the hot-dip galvanized steel sheet according to (1) or (2), the microstructure may contain, by volume fraction, more than 60% of one or two of martensite and bainite.

(5) In the hot-dip galvanized steel sheet according to any one of (1) to (4), the steel sheet may further contain, by mass %, one or two or more of Cr: 0.05% to 1.0%. Mo: 0.01% to 1.0%, Ni: 0.05% to 1.0%. Cu: 0.05% to 1.0%, Nb: 0.005% to 0.3%. Ti: 0.005% to 0.3%, V: 0.005% to 0.5%, B: 0.0001% to 0.01%. Ca: 0.0005% to 0.04%, Mg: 0.0005% to 0.04%, and REM: 0.0005% to 0.04%.

(6) A manufacturing method of a hot-dip galvanized steel sheet according to one aspect of the present invention includes: casting a molten steel including a chemical components according to (1) to obtain a steel; heating the steel to a first temperature range of 1100° C. to lower than 1300° C., directly or after cooling once; completing a hot rolling of the steel at a temperature equal to or higher than an Ar3 transformation point: coiling the steel in a second temperature range of 300° C. to 700° C.; pickling the steel; performing cold rolling of the steel with a cumulative rolling reduction of 40% to 80% using a cold rolling mill including a work roll having a roll diameter of 200 mm to 1400 mm; retaining the steel in a third temperature range of 550° C. to 750° C. for 20 seconds to 2000 seconds during heating the steel to an annealing temperature, when the steel passes through a continuous galvanizing line; maintaining the steel in a fourth temperature range of 750° C. to 900° C. for 10 seconds to 1000 seconds, in an $N_2$ atmosphere in which an $H_2$ concentration is equal to or less than 20% and a dew point is equal to or higher than 20° C., while performing an annealing; performing a first cooling of cooling the steel to a fifth temperature range of 500° C. to 750° C. at an average cooling rate of 1° C./sec to 200° C./sec; performing second cooling of cooling the steel to a sixth temperature range between a temperature which is lower than a hot dip galvanizing bath temperature by 40° C. and a temperature which is higher than the hot dip galvanizing bath temperature by 50° C., at an average cooling rate which is 1° C./sec to 200° C./sec and is faster than the average cooling rate of the first cooling; galvanizing the steel by immersing the steel in a hot dip galvanizing bath which flows at a flow velocity of 10 m/min to 50 m/min after setting a plating bath immersion sheet temperature which is a temperature when immersing the steel in the hot dip galvanizing bath, as the sixth temperature range; and cooling the steel to a temperature equal to or lower than 40° C.

(7) A manufacturing method of a hot-dip galvanized steel sheet according to another aspect of the present invention includes: casting a molten steel including a chemical components according to (2) to manufacture steel; heating the steel to a seventh temperature range of 1100° C. to lower than 1300° C., directly or after cooling once; completing a hot rolling of the steel at a temperature equal to or higher than an Ar3 transformation point; coiling the steel in an eighth temperature range of 300° C. to 700° C.; pickling the steel; performing cold rolling of the steel with a cumulative rolling reduction of 40% to 80% using a cold rolling mill including a work roll having a roll diameter of 200 mm to 1400 mm; retaining the steel in a ninth temperature range of 550° C. to 750° C. for 20 seconds to 2000 seconds during heating the steel to an annealing temperature, when the steel passes through a continuous galvanizing line; maintaining the steel in a tenth temperature range of 750° C. to 900° C. for 10 seconds to 1000 seconds, in an $N_2$ atmosphere in which an $H_2$ concentration is equal to or less than 20% and a dew point is equal to or higher than 20° C., while performing an annealing; performing a third cooling of cooling the steel to an eleventh temperature range of 500° C. to 750° C. at an average cooling rate of 1 °C./sec to 200 °C./sec; performing a fourth cooling of cooling the steel to a twelfth temperature range of 500° C. to 25° C., at an average cooling rate which is 1 °C./sec to 200 °C./sec and is faster than the average cooling rate of the third cooling; heating the steel again to a thirteenth temperature range of 350° C. to 500° C., in a case where a cooling stop temperature of the fourth cooling is lower than 350° C.; retaining the steel in the thirteenth temperature range; galvanizing the steel by immersing the steel in a hot dip galvanizing bath which flows at a flow velocity of 10 m/min to 50 m/min after setting a plating bath immersion sheet temperature which is a temperature when immersing the steel in the hot dip galvanizing bath, as a fourteenth temperature range between a temperature which is lower than a hot dip galvanizing bath temperature by 40° C. and a temperature which is higher than the hot dip galvanizing bath temperature by 50° C.; performing an alloying treatment to the steel at a fifteenth temperature range of equal to or lower than 600° C.; and cooling the steel to a temperature equal to or lower than 40° C.

(8) In the manufacturing method of a hot-dip galvanized steel sheet according to (6) or (7), the annealing may be performed at a temperature lower than 840° C.

(9) In the manufacturing method of a hot-dip galvanized steel sheet according to (6) or (7), the annealing may performed at a temperature equal to or higher than 840° C.

(10) In the manufacturing method of a hot-dip galvanized steel sheet according to any one of (6) to (10), the molten steel may further contain, by mass %, one or two or more of Cr: 0.05% to 1.0%, Mo: 0.01% to 1.0%, Ni: 0.05% to 1.0%, Cu: 0.05% to 1.0%, Nb: 0.005% to 0.3%, Ti: 0.005% to 0.3%, V: 0.005% to 0.5%, B: 0.0001% to 0.01%. Ca: 0.0005% to 0.04%, Mg: 0.0005% to 0.04%, and REM: 0.0005% to 0.04%.

Effects of the Invention

According to the present invention, a hot-dip galvanized steel sheet which is suitable for a structural member, a reinforcing member, and a suspension member for a vehicle, has a tensile strength of equal to or greater than 980 MPa, and has excellent plating adhesion and delayed fracture resistance, can be provided at low cost.

EMBODIMENTS OF THE INVENTION

Figure 1:
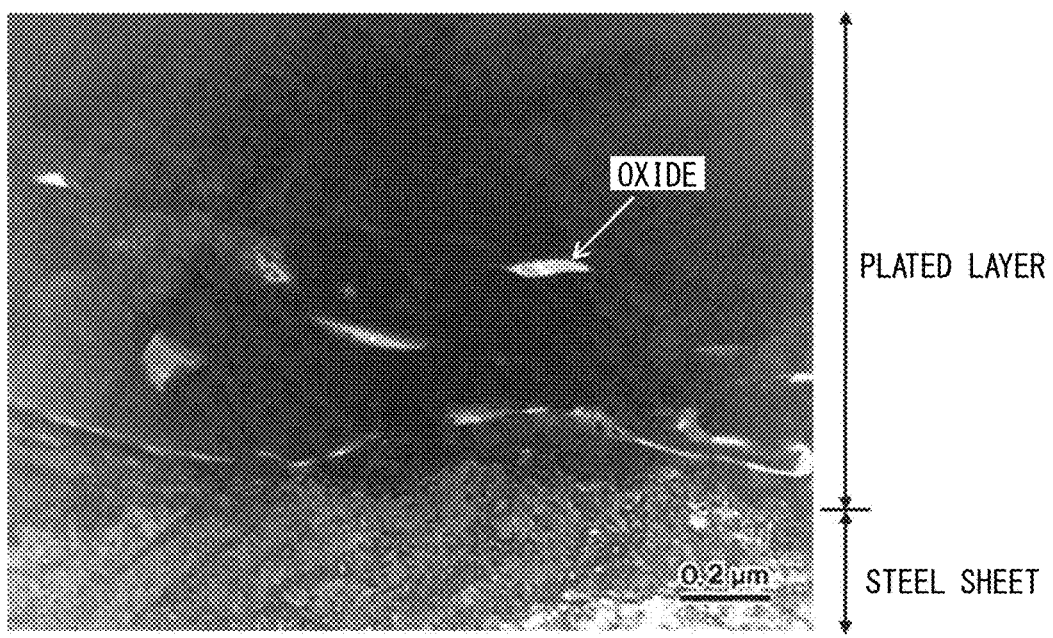
FIG. 1 is a photograph obtained by observing a cross section of a hot-dip galvanized steel sheet according to one embodiment of the present invention which was processed using an FIB processing device, with an FE-TEM at a magnification of 50,000-fold.

The present inventors have studied to solve the aforementioned problems. As a result, the inventors have found that, after performing cold rolling of steel with cumulative rolling reduction of equal to or greater than 40% using a cold rolling mill including a work roll having a roll diameter of equal to or smaller than 1400 mm, by retaining the steel at a temperature range of 550° C. to 750° C. for 20 seconds or longer during heating the steel at the time of annealing, oxides containing one or more of Si, Mn, and Al independently or in combination with each other, can be formed on a steel sheet surface layer. In addition, the present inventors have found that, after forming the oxides on the steel sheet surface layer, by immersing the steel sheet in a hot dip galvanizing bath which flows at a flow velocity of 10 m/min to 50 m/min, and performing a hot dip galvanizing treatment, or hot dip galvanizing treatment and alloying treatment, the oxides can be dispersed in a plated layer so that a projected area ratio of the oxides is equal to or more than 10% and excellent plating adhesion is also obtained. Further, the present inventors have found that by appropriately dispersing the oxides in the plated layer, the oxides can be used as a trap site and delayed fracture resistance is improved.

Hereinafter, the embodiment will be described in detail.

A hot-dip galvanized steel sheet according to the embodiment includes a steel sheet, and a plated layer on a surface of the steel sheet. The plated steel sheet may further include various covering layers such as an organic layer or an inorganic layer on a surface of the plated layer. Where such a covering layer is not formed on the plated steel sheet, the plated steel sheet includes the steel sheet, and the plated layer on the surface of the steel sheet.

First, the plated layer disposed on the steel sheet will be described. This plated layer includes a hot-dip galvanized layer and a galvannealed layer.

The plated layer is provided on the surface of the steel sheet and contains oxides containing one or two or more of Si, Mn, and Al independently or in combination with each other. In the embodiment, it is most important to disperse the oxides containing one or two or more of Si, Mn, and Al in the plated layer, in the plated layer. Particularly, the effect thereof is significantly obtained by dispersing the oxides in the plated layer so that a projected area ratio when observing the steel sheet in a surface direction of the steel sheet, that is, an area ratio obtained by dividing the length of the oxides projected to an interface between the plated layer and the steel sheet by the length of an interface between the plated layer and the steel sheet when a cross section including the steel sheet and the plated layer is seen in a sheet thickness direction, is equal to or more than 10%. This projected area ratio can also be referred to as apparent coverage of the oxides which make a shadow on the surface of the steel plate, when the steel sheet is seen from above the surface of the hot-dip galvanized steel sheet. Although the specific mechanism is not clear, since the oxides have various defects, the oxides in the plated layer trap hydrogen (for example, hydrogen generated by a corrosion reaction or hydrogen in the atmosphere) which enters from the steel sheet surface and delay hydrogen from entering to the inside of the steel sheet, and delayed fracture resistance may thereby be improved. Since an automobile steel sheet is used in alternating wet and dry environment, that is, in a wet-dry environment, hydrogen which is once trapped by the oxides existing on the steel sheet surface layer in the wet environment is discharged to an environment in the dry environment. Accordingly, dispersing the oxides in the plated layer as described above may have a greater effect on the delayed fracture resistance in an actual use environment of a vehicle.

The shape of the oxides described above may be any of a film, granular, or string shape, and the effect of the embodiment can be obtained as long as the projected area ratio is in the range described above. However, the film-shaped oxides tend to have a greater projected area ratio with respect to a volume fraction, and thus, the shape of the oxides is desirably formed in the film shape so that the projected area ratio is in the range of the embodiment by the treatment in a short time.

The oxides to be dispersed in the plated layer are set to oxides of Si, Mn, or Al, because the oxides thereof have a high melting point compared to that of zinc, such that the oxides (for example, having a film shape) are easily dispersed in the plated layer. Particularly, in the case of using the film-shaped oxides, it is possible to more easily achieve the projected area ratio of equal to or more than 10%. In addition, if the oxides are dispersed in a region of the plated layer within 5 µm from an interface between the steel sheet and the plated layer, a more significant hydrogen trapping effect is obtained. After forming the oxides on the steel sheet surface layer, by performing the hot dip galvanizing treatment, or the hot dip galvanizing treatment and the alloying treatment, the oxides may be dispersed inside of the plated layer as shown in FIG. 1. The oxides are used on the steel sheet surface, because the characteristic of the oxides, such as a size or number density, is easily controlled and it is advantageous for generating oxides, corresponding to the projected area ratio of equal to or more than 10%.

Herein, as the oxides containing one or two or more of Si, Mn, and Al independently or in combination with each other, $SiO_2$, MnO, $Al_2O_3$, $Mn_2SiO_4$, and the like are used, and $SiO_2$ and $Mn_2SiO_4$ are preferable.

In addition thereto, the same effect is obtained even in the case of containing oxide ($Cr_2O_3$) which contains Cr.

On the other hand, it is difficult to plate molten zinc containing oxides onto the steel sheet. For example, although the oxides are dispersed in the molten zinc, the oxides form clusters due to Van der Waals' forces, and become large oxides having a size of 1 μm to several mm. The large oxides may cause non-plating or defects. Therefore, it is not preferable to disperse the oxides in molten zinc. In addition, normally, in order to improve the plating adhesion, it is general to remove the oxide on the surface of the steel sheet before plating to obtain a normal surface, and the oxides are not formed intentionally on the surface of the steel sheet before the plating.

Oxides of Zn or Al exist in the molten zinc as unavoidable oxides. It is desirable to remove the oxides as much as possible, or to control a reaction with the steel sheet, but the oxides may inevitably (for example, equal to or less than 5%) exist in the plated layer. However, since the plated layer is easily oxidized, there is a case that oxide of Zn exists on the surface of the plated layer, but this is not counted as the oxides in the plated layer.

The oxides to be dispersed in the plated layer in the embodiment are oxides containing Si, Mn, or Al independently or in combination with each other. The oxides can be controlled by addition of Si, Mn, or Al to the steel sheet and by controlling the atmosphere at the time of annealing. Meanwhile, with the addition of elements such as Ni, Cu, and the like which are hardly oxidized, since, not only the oxidation of the additive elements, but oxidation of Fe is caused, it is difficult to secure the projected area ratio of the oxides and plating properties. Accordingly, in the embodiment, by adding Si, Mn, or Al as elements which are more easily oxidized than Fe to the steel sheet, and setting the annealing conditions and the furnace atmosphere to predetermined conditions, oxides containing the elements independently or in combination with each other, are formed on the steel sheet surface.

Figure 2:
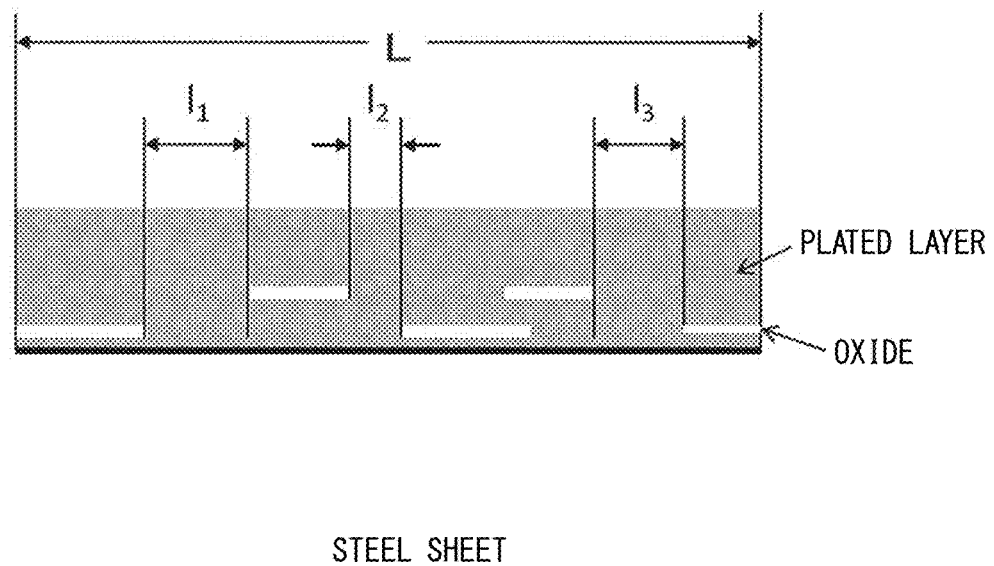
FIG. 2 is a diagram schematically showing a calculation method of a projected area ratio of oxides in a plated layer of a hot-dip galvanized steel sheet of the embodiment.

It is necessary that the oxides is present so that the projected area ratio is equal to or more than 10% as described above with respect to the steel sheet surface. In the embodiment, since the oxides are used to trap hydrogen entering from the steel sheet surface, the oxides desirably exist in the plated layer and widely cover the interface between the steel sheet and the plated layer. The effect thereof is obtained by setting the projected area ratio to be equal to or more than 10%. The projected area ratio is desirably equal to or more than 15% and more desirably equal to or more than 20%. On the other hand, if the projected area ratio exceeds 90%, the alloying reaction becomes extremely slow, and high-temperature alloying is necessary to set Fe % in the plated layer to be in a predetermined range. In this case, since austenite transforms into pearlite, a predetermined material property cannot be obtained. The projected area ratio by the oxides can be easily measured by observing the cross section of the hot-dip galvanized steel sheet. In detail, as shown in FIG. 2, the projected area ratio can be evaluated based on a ratio of an oxide length in a parallel direction, with respect to the interface between the plated layer and the steel sheet. For example, as shown in FIG. 2, in a case where the oxides are vertically projected with respect to the interface (interface approximated as a straight line) between the plated layer and the steel sheet, a projected area ratio A (%) can be evaluated based on a ratio of the projection length (for example, lengths ($L-1_1-1_2-1_3$) in FIG. 1) of the projected oxides (shadow) with respect to the length (for example, length L in FIG. 2) of the interface between the plated layer and the steel sheet. In the embodiment, measurement is performed at 5 visual fields at a magnification of 10,000-times, and the average value thereof is defined as the projected area ratio. Since the object of the oxide dispersion of the embodiment is to trap the hydrogen entering thereto, with the oxides in the plated layer, the oxides may be overlapped with each other.

The composition identification and evaluation of the oxides can be performed by performing observation of the microstructure with the cross section of the hot-dip galvanized steel sheet. For example, there is a method of processing the cross section of the steel sheet into thin flakes so as to contain the plated layer, using a focus ion beam (FIB) processing device, and then performing observation with field emission transmission electron microscopy (FE-TEM) and composition analysis with energy dispersive X-ray spectrometry (EDX). In the embodiment, after manufacturing samples for observation with the FIB processing device, the oxides were observed with the FE-TEM at a magnification of 50,000-fold. In addition, by analyzing the oxides with the EDX, the oxides were identified.

The plated layer is a hot-dip galvanized layer or a galvannealed layer containing equal to or less than 15 mass % of Fe. If the amount of Fe exceeds 15 mass %, adhesion of the plated layer itself is deteriorated and the plated layer fractures, is removed, and is attached to a die during processing, and this causes defects at the time of the formation. In a case where spot weldability or a coating property is desired, it is desirable to improve the properties of the plated layer in the alloying treatment. In detail, after immersing the plated layer in the hot dip galvanizing bath, by performing the alloying treatment, Fe is introduced into the plated layer, and it is possible to obtain a high-strength hot-dip galvanized steel sheet including the galvannealed layer having an excellent coating property or spot weldability. However, in a case of performing the alloying treatment, if the amount of Fe after the alloying treatment is less than 7 mass %, the spot weldability is not sufficient. Therefore, when performing the alloying treatment, that is, when the plated layer is the galvannealed layer, the range of the amount of Fe in the plated layer is desirably 7 mass % to 15 mass %.

The chemical composition of the plated layer desirably contains, by mass %, equal to or less than 15% of Fe, and a remainder of 80% to 100% of Zn, equal to or less than 2% of Al, and unavoidable impurities. As the unavoidable impurities in the plated layer, there are unavoidable impurities mixed therein when manufacturing (for example, unavoidable impurities in the plating bath or chemical elements coming from the chemical composition of the steel sheet (excluding Fe, Al, and Zn), or chemical elements from pre-plating performed if necessary (Ni, Cu, and Co)). The plated layer may contain chemical elements such as Fe, Al, Mg, Mn, Si, Cr, Ni, Cu, and the like, in addition to Zn.

A plating weight (amount of plated layer attached per unit area) is not particularly limited, but is desirably equal to or greater than 5 g/m$^2$ by one side surface weight from a viewpoint of corrosion resistance. In addition, the plating weight is desirably equal to or smaller than 100 g/m$^2$ by one side surface weight from a viewpoint of securing the plating adhesion.

In addition, in order to further improve the plating adhesion, plating with Ni, Cu, Co, and Fe independently or in combination with each other may be performed on the steel sheet before annealing.

When the plated layer is the galvannealed layer, the effective Al concentration in the plating bath is desirably controlled to be in a range of 0.05 mass % to 0.500 mass % in order to control the properties of the plated layer. Herein, the effective Al concentration in the plating bath is a value obtained by subtracting the Fe concentration in the plating bath from the Al concentration in the plating bath.

In a case where the effective Al concentration is lower than 0.05 mass %, excellent appearance may not be obtained due to significant dross generation. On the other hand, in a case where the effective Al concentration is higher than 0.500 mass %, the alloying is slow and productivity is degraded. Therefore, the effective Al concentration in the bath is desirably from 0.05 mass % to 0.500 mass %.

In order to measure Fe and Al content in the plated layer, a method of performing chemical analysis of a solution after dissolving the plated layer with acid and removing non-dissolved oxides, may be used. For example, a method of dissolving only the plated layer of the galvannealed steel sheet obtained by cutting to have a size of 30 mm×40 mm, with a 5% HCl aqueous solution to which an inhibitor is added, while suppressing elution of a steel sheet base material, and determining the Fe and Al content from signal strength obtained by performing inductively coupled plasma (ICP) emission analysis of the solution and a calibration curve created from solutions having known concentrations, may be used. By considering variation in measurement between samples with at least three samples cut out from the same galvannealed steel sheet, the average of measured values of the samples may be calculated.

In order to improve the coating property and weldability, upper layer plating may be additionally performed, or various treatments, for example, chromate treatment, phosphating, lubricity improvement treatment, weldability improvement treatment, and the like may be performed on the hot-dip galvanized steel sheet according to the embodiment, and this does not negatively affect the effect of the embodiment.

Next, a steel sheet which is a material to be plated will be described.

The steel sheet contains chemical components which will be described later, a microstructure of the steel sheet contains, by volume fraction, equal to or more than 20% and equal to or less than 99% in total of one or two of martensite and bainite, and a residual structure of the steel sheet contains ferrite, and one or two of less than 8% by volume fraction of residual austenite, and equal to or less than 10% by volume fraction of pearlite.

In order to secure a tensile strength of equal to or greater than 980 MPa, a total of 20% or more of martensite and bainite is contained. It is not necessary to particularly limit the total volume fraction of martensite and bainite, but when considering actual manufacturing, since it is not easy to set the total volume fraction to 100%, the total volume fraction may be equal to or less than 99%. Since bainite has a strength lower than that of martensite, the volume fraction of bainite is desirably equal to or less than 70%, in a case of the tensile strength of equal to or greater than 980 MPa. The residual austenite transforms into martensite during bending or tensile processing. Since the martensite formed in this process is hard, the delayed fracture resistance is degraded. Therefore, the volume fraction of the residual austenite is set to be less than 8%. In addition, if the volume fraction of the pearlite structure exceeds 10%, it is difficult to secure a strength of equal to or greater than 980 MPa, and an upper limit of the pearlite is therefore set to 10%. The volume fraction of the residual austenite and the pearlite may be 0%.

However, in a case where elongation is further required to be improved, it is desirable that ferrite be contained at the volume fraction of 40% to 80%. Ductility (elongation) is improved by setting the volume fraction of the ferrite to equal to or greater than 40%. When the volume fraction of the ferrite is less than 40%, the effect thereof is slight. On the other hand, when the volume fraction thereof exceeds 80%, the total volume fraction of martensite and bainite becomes less than 20%, and it is difficult to secure a high strength with the tensile strength of 980 MPa. The martensite may be any of tempered martensite containing carbides, and quenched martensite not containing carbides. The bainite structure may also be any of lower bainite containing carbides in bainite laths, and upper bainite containing carbides between the laths.

Meanwhile, in a case of further improving hole expandability, it is desirable that one or two of martensite and bainite at greater than 60% in total is contained. The reason why the martensite and bainite are contained at volume fraction of greater than 60% in total, is to secure a strength of equal to or greater than 980 MPa while improving the hole expandability, and when the total volume fraction thereof is equal to or smaller than 60%, the effect thereof is slight.

In identification, observation of existing positions, and measurement of the area ratio of each phase of the microstructure which are ferrite, martensite, bainite, austenite, pearlite, and the residual structure, a cross section of the steel sheet in a rolling direction or a cross section thereof in a direction orthogonal to the rolling direction is etched by a nital reagent and a reagent disclosed in Japanese Unexamined Patent Application, First Publication No. S59-219473, and quantitation can be performed with optical microscope observation with a magnification of 1,000-fold and a scanning transmission electron microscope with a magnification of 1,000-fold to 100,000-fold. The observation at 20 or more visual fields is performed, and the area ratio of each structure can be acquired by a point counting method or image analysis. Although the measurement method is two-dimensional observation, in the steel sheet according to the embodiment, the same area ratio is obtained over all the cross sections. Therefore, the area ratio is equal to the volume fraction.

Next, reasons for limitation of the chemical components of the steel sheet which is a material to be plated will be described. % of the chemical component hereinafter represents mass %.

C: C is an element used to increase the strength of the steel sheet. However, if the C content is less than 0.05%, it is difficult to achieve both a tensile strength of equal to or greater than 980 MPa and the workability. On the other hand, if the C content is equal to or more than 0.40%, it is difficult to secure spot weldability. In addition, the residual austenite is excessively generated and the delayed fracture resistance is decreased. Therefore, the range thereof is limited to equal to or more than 0.05% and less than 0.40%.

Si: Si can be dispersed in the plated layer as the oxide. Thus, Si is a most important additive element used to improve hydrogen embrittlement resistance (delayed fracture resistance). However, when the added amount thereof is less than 0.5%, the amount of the oxides is not sufficient, and the delayed fracture resistance is not sufficiently improved. Therefore, it is necessary to add 0.5% or more of Si. On the other hand, when the added amount thereof exceeds 3.0%, the workability is degraded, the steel sheet is embrittled, and the occurrence of the delayed fracture is promoted. In addition, the pickling property is degraded. Accordingly, the Si content is limited to a range of 0.5% to 3.0%. In addition. Si is a reinforcing element and is effective at increasing the strength of the steel sheet. The Si content is more preferably from 0.5% to 2.5% and even more preferably from 0.5% to 2.0%.

Mn: Mn is a reinforcing element and is effective at increasing the strength of the steel sheet. In addition, Mn can be dispersed in the plated layer as the oxide. However, when the Mn content is less than 1.5%, it is difficult to obtain a tensile strength of equal to or greater than 980 MPa. On the other hand, when the Mn content exceeds 3.0%, co-segregation of P and S is promoted and workability is significantly degraded. In addition, the residual austenite is excessively generated and the delayed fracture resistance is decreased. Therefore, 3.0% is set to the upper limit. A more preferably range thereof is from 2.0% to 2.8%.

O: O in the steel sheet forms the oxides in the steel sheet (except surface part). The oxides contained in the steel sheet degrade elongation and hole expandability. Accordingly, it is necessary to suppress the added amount of O in the steel sheet. Particularly, the oxides exist as inclusions in many cases, and if the oxides exist on a punched end surface or on a cut-out cross section, a cut-out-shaped defect or a coarse dimple is formed on the end surface. This results in stress concentration at the time of hole expanding and high-strengthening process, and this becomes the origin of crack formation to cause significant degradation in the hole expandability, bendability, and delayed fracture resistance. If the O content exceeds 0.006%, this tendency becomes significant, and accordingly the upper limit of the O content was set to be equal to or less than 0.006%. On the other hand, it is preferable that a small amount of O be contained in the steel sheet, but if the O content is less than 0.0001%, it is not economically preferable due to excessively high cost, and accordingly this is substantially the lower limit. However, in the hot-dip galvanized steel sheet according to the embodiment, since the oxides are dispersed in the plated layer, the O content in the plated layer or in the vicinity of the interface between the plated layer and the steel sheet is higher than inside the steel sheet. Since the oxides existing on the surface of the steel sheet exist on the surface of the steel sheet or in the plated layer, the oxides existing on the surface of the steel sheet are not defined as the oxides contained in the steel sheet or oxygen content of the steel sheet. In detail, in a case of measuring the O content of the steel sheet, the measurement is performed after removing the plated layer and performing mechanical polishing of the steel sheet surface by 10 μm.

P: P tends to be segregated at a sheet thickness center part of the steel sheet and embrittles a weld. If the P content exceeds 0.04%, the embrittlement of the weld becomes significant, and therefore the P content is limited to be equal to or less than 0.04%. If the P content exceeds 0.04%, the steel sheet is embrittled and the occurrence of the delayed fracture is promoted. A lower limit value of P is not particularly specified, but if the lower limit value thereof is less than 0.0001%, it is not economical, and therefore this value is preferably set as the lower limit value.

S: S negatively affects the weldability, and manufacturability at the time of casting and hot rolling. Therefore, the S content is limited to be equal to or less than 0.01%. S bonds with Mn to form coarse MnS. This MnS degrades the bendability or the hole expandability, or promotes the occurrence of the delayed fracture. Accordingly, it is desirable for the S content to be as small as possible. However, a S content of less than 0.0001% is not economical, and therefore this value is preferably set as a lower limit value.

Al: Al may be added as Al and can be used to improve delayed fracture resistance by being dispersed in the plated layer as the oxide. In addition, Al can also be used as a deoxidizing material. However, excessive addition thereof increases the number of Al-based coarse inclusions, and causes degradation of the hole expandability or the occurrence of surface defects. In addition, excessive Al addition is not preferable because excessive Al addition embrittles the steel sheet and promotes the occurrence of delayed fractures. Therefore, the upper limit of Al addition was set to 2.0%. The lower limit thereof is not particularly limited, but it is difficult to set the Al content to be equal to or less than 0.0005%, and therefore this is substantially the lower limit.

N: N forms coarse nitrides in the steel. The nitrides degrades the bendability or the hole expandability and degrades the delayed fracture resistance, and accordingly it is necessary to reduce the amount thereof added. If N exceeds 0.01%, these tendencies become significant, and therefore the range of N content is set to be equal to or less than 0.01%. In addition, it is desirable to set the N content to be small since N causes generation of blowholes at the time of welding. Thus, it is not necessary to particularly specify the lower limit thereof. However, if the N content is less than 0.0005%, the manufacturing costs is significantly increase, and therefore this is substantially the lower limit.

The hot-dip galvanized steel sheet according to the embodiment basically has the composition including the elements described above and the remainder including iron and unavoidable impurities, but can further contain any one or two or more of the following elements as elements used from the related art to improve strength or the like. Even if the selective elements are inevitably mixed into the steel sheet (for example, an amount which is less than a preferable lower limit of each selective element), the effects of the embodiment are not degraded. In addition, since it is not necessary to add the chemical elements to the steel sheet, all of the lower limits of the chemical elements are 0% and not limited.

Mo: Mo is a reinforcing element and is important for improving hardenability. However, if the Mo content is less than 0.01%, the effects thereof are not obtained, and accordingly a lower limit value when adding Mo was set to 0.01%. On the other hand, if more than 1.0% of Mo is contained, it negatively affects the manufacturability at the time of manufacturing and hot rolling, embrittles the steel sheet, and promotes the occurrence of delayed fractures, and therefore the upper limit thereof is set to 1.0%.

Cr: Cr is a reinforcing element and is effective for improving hardenability. However, if the Cr content is less than 0.05%, the effects thereof are not obtained, and accordingly the lower limit of Cr is set to 0.05% when Cr is added. On the other hand, if more than 1.0% of Cr is contained, it negatively affects the manufacturability at the time of manufacturing and hot rolling, embrittles the steel sheet, and promotes the occurrence of delayed fractures, and therefore the upper limit therefore is to 1.0%.

Ni: Ni is a reinforcing element and is effective for improving hardenability. In addition, Ni may be added as it causes the improvement of wettability and promotion of the alloying reaction. However, if the Ni content is less than 0.05%, the effects thereof are not obtained, and accordingly a lower limit value when adding Ni was set to 0.05%. On the other hand, if more than 1.0% of Ni is contained, it negatively affects the manufacturability at the time of manufacturing and hot rolling, and therefore an upper limit value was set to 1.0%.

Cu: Cu is a reinforcing element and is effective for improving hardenability. In addition, Cu may be added as it improve wettability and promote of the alloying reaction. However, if the Cu content is less than 0.05%, the effects thereof are not obtained, and accordingly the lower limit of Cu is set to 0.05% when Cu is added. On the other hand, if more than 1.0% of Cu is contained, it negatively affects the manufacturability at the time of manufacturing and hot rolling, and therefore the upper limit is set to 1.0%.

B is effective at reinforcing grain boundaries or reinforcement of the steel by adding equal to or more than 0.0001 mass % of B, but if the added amount thereof exceeds 0.01 mass %, not only the effects thereof saturate, but also the manufacturability at the time of hot rolling is degraded. Therefore, the added amount of B was set to 0.0001% to 0.01%.

Ti: Ti is a reinforcing element. This contributes to an increase in strength of the steel sheet, with precipitate strengthening, fine-grain strengthening realized by suppressing ferrite grain growth, and dislocation strengthening realized by suppressing recrystallization. If the added amount is less than 0.005%, the effects thereof are not obtained, and accordingly the lower limit of Ti is set to 0.005% when Ti is added. If more than 0.3% of Ti is contained, precipitation of carbonitride increases, and the formability or the delayed fracture resistance is degraded, and therefore an upper limit value was set to 0.3%.

Nb: Nb is a reinforcing element. This contributes to an increase in strength of the steel sheet, with precipitate strengthening, fine-grain strengthening realized by suppressing ferrite grain growth, and dislocation strengthening realized by suppressing recrystallization. If the added amount is less than 0.005%, the effects thereof are not obtained, and accordingly the lower limit of Nb is set to 0.005% when Nb is added. If more than 0.3% of Nb is contained, precipitation of carbonitride increases and formability is degraded, and therefore the upper limit thereof is set to 0.3%.

V: V is a reinforcing element. This contributes to an increase in strength of the steel sheet, with precipitate strengthening, fine-grain strengthening realized by suppressing ferrite grain growth, and dislocation strengthening realized by suppressing recrystallization. If the added amount is less than 0.005%, the effects thereof are not obtained, and accordingly the lower limit of V is set to 0.005% when V is added. If more than 0.5% of V is contained, precipitation of carbonitride increases and formability is degraded, and therefore the upper limit thereof is set to 0.5%.

0.0005% to 0.04% of one or two or more elements selected from Ca, Mg, and REM may be added. Ca, Mg, and REM are elements used for deoxidation, and equal to or more than 0.0005% of one or two or more elements in total is preferably contained for obtaining the effect thereof. REM is rare earth metals. However, if content of each element exceeds 0.04%, forming workability is degraded. Therefore, the content of each element is preferably 0.0005% to 0.04% in total. In the embodiment, REM is added as misch metal in many cases, and may contain lanthanoid elements other than La or Ce in combination. Although the lanthanoid elements other than La or Ce are contained as unavoidable impurities, the effects of the embodiment are exhibited. Even when metal La or Ce is added, the effects of the embodiment are exhibited.

The hot-dip galvanized steel sheet according to the embodiment may further contain elements (for example. Zr, Sn, Co, As, and the like) other than the elements described above as unavoidable impurities, in a range which does not degrade the properties.

The hot-dip galvanized steel sheet according to the embodiment has the tensile strength TS of equal to or greater than 980 MPa and has excellent delayed fracture resistance and plating adhesion. The hot-dip galvanized steel sheet (material) according to the embodiment can be suitably obtained with a manufacturing method of the embodiment which will be described later, using a product manufactured by performing each process of smelting, steelmaking (refining), casting, hot rolling, and cold rolling which are typical steel manufacturing processes, in principle. However, even when a product manufactured by omitting a part or all of the steel manufacturing process is used, as long as the conditions according to the embodiment are satisfied, the effects described in the embodiment can be obtained, and thus the hot-dip galvanized steel sheet according to the embodiment is not limited to being manufactured by the manufacturing method.

Hereinafter, the manufacturing method of a hot-dip galvanized steel sheet according to one embodiment of the present invention will be described.

In order to obtain the hot-dip galvanized steel sheet according to one embodiment of the present invention, it is important to perform control of the oxides on the steel sheet surface layer and control of jet flow of molten zinc in the plating bath.

The manufacturing method preceding the hot rolling is not particularly limited. That is, various secondary smelting may be performed after melting with a blast furnace or an electrical furnace, and then molten steel including the chemical components described above may be cast by a method such as thin slab casting, general continuous casting, or casting with an ingot method. In a case of the continuous casting, after cooling to a lower temperature once and then heating again, hot rolling may be performed or hot rolling of the cast slab may be continuously performed. Scrap may be used as a raw material.

It is necessary to set the slab heating temperature before the hot rolling to be equal to or higher than 1100° C. If the slab heating temperature is lower than 1100° C., a finish rolling temperature may be lower than an Ar3 point. In this case, dual phase rolling of ferrite and austenite is performed, a hot-rolled sheet structure becomes an inhomogeneous duplex grain structure, the inhomogeneous structure is not removed even when performing the cold rolling and annealing process, and the ductility or the bendability is degraded. In addition, in the embodiment, in order to secure a maximum tensile strength of equal to or greater than 980 MPa after the annealing, an amount of alloy element is great compared to that of soft steel or the like, and the strength at the time of finish rolling tend to be increased. Accordingly, if the slab heating temperature is lower than 1100° C., it is difficult to perform the rolling due to an increase in a rolling force accompanied with the decrease of the finish rolling temperature, and this may cause a defect of a shape of the steel sheet after the rolling. The effects of the embodiment are exhibited without particularly specifying an upper limit of the slab heating temperature, but if the heating temperature is excessively high, it is not economically preferable. Therefore, the upper limit of the slab heating temperature is lower than 1300° C.

In the embodiment, the Ar3 transformation point is calculated with the following equation.

$$\text{Ar3 transformation point}(\degree \text{C.})=901-325\times C+33\times Si-92\times(Mn+Ni/2+Cr/2+Cu/2+Mo/2)$$

(C, Si Mn. Ni, Cr, Cu, and Mo in the equation are each component content [mass %] in the steel.)

The finish rolling temperature of the hot rolling (hot rolling finish temperature) is set to be equal to or higher than the Ar3 transformation point. The effects of the embodiment are exhibited without particularly specifying the upper limit. If the rolling temperature is lower than the Ar3 transformation point, it is difficult to e manufacture as the rolling force becomes excessively high, and the hot rolling is performed with the dual phase of the ferrite and the austenite, and accordingly the microstructure of the steel sheet after the hot rolling becomes inhomogeneous. That is, the ferrite generated in the finish rolling is stretched in the rolling, is coarsened, and the ferrite transformed from the austenite has a film shape after the rolling. Even if the cold rolling and the annealing are performed to perform the microstructure control, the steel sheet having the inhomogeneous microstructure is not preferable as the materials vary with respect to each other and the delayed fracture resistance is degraded. On the other hand, it is not preferable to set the finish rolling temperature of the hot rolling to an excessive high temperature, as it is necessary to set the heating temperature of the slab to an excessive high temperature for securing the temperature. Therefore, an upper limit temperature of the finish rolling temperature of the hot rolling is desirably equal to or lower than 1000° C.

The conditions of the cooling after the hot rolling are not particularly specified, and the effects of the embodiment are obtained by using a cooling pattern for performing the microstructure control for the respective requirements.

Coiling is performed after the hot rolling. It is necessary to set a coiling temperature to be from 300° C. to 700° C. If the coiling temperature exceeds 700° C., coarse ferrite or pearlite structure is generated in the hot-rolled structure, structure inhomogeneity after the annealing becomes significant, and material anisotropy of a final product becomes significant. In addition, it is not preferable to perform the coiling at a temperature exceeding 700° C., a thickness of the oxides formed on the steel sheet surface is excessively increased, and accordingly, the pickling property is degraded. On the other hand, if the coiling temperature is equal to or lower than 300° C., the strength of the hot-rolled sheet becomes great, and accordingly the cold rolling force becomes high. This results in difficulty of the cold rolling or the manufacturing difficulty such as sheet breakage.

In addition, the roughly-rolled sheets may be joined to each other at the time of the hot rolling to continuously perform the finish rolling. The roughly-rolled sheets may be coiled once.

The pickling is performed on the hot-rolled steel sheet which is coiled as described above. The pickling is important for improving the plating properties as the oxides on the steel sheet surface can be removed. As the pickling method, a well-known method may be used. In addition, the pickling may be performed once or may be performed separately multiple times.

The pickled hot-rolled steel sheet is subjected to the cold rolling with the cumulative rolling reduction of 40% to 80% and the sheet passes through a continuous galvanizing line. Since Si, Al, or Mn which forms the oxides described above is supplied by the diffusion from the inside of the steel sheet (in particular, on the grain boundary), the oxides are easily formed in the vicinity of the grain boundary of the steel sheet surface. As a result, if the grain size of the ferrite is great, the ratio of the grain boundary on the steel sheet surface is small, and it is difficult to set the projected area ratio of the oxides to be equal to or more than 10%. In general, ferrite as cold-rolled is stretched in a rolling direction and the ratio of the grain boundary is small. As a result, in a case where the structure as cold-rolled is annealed, it is difficult to set the projected area ratio of the oxides to be equal to or more than 10%. Accordingly, it is necessary to promote the formation of the oxides by recrystallizing the ferrite and decreasing the grain size, before forming the oxides. When the cumulative rolling reduction of the cold rolling is less than 40%, strain necessary for recrystallization is not sufficiently introduced. In addition, the ductility of the final product is degraded, and therefore this is set to the lower limit. Further, when the cumulative rolling reduction is less than 40%, it is difficult to maintain a flat shape. On the other hand, in the cold rolling with the cumulative rolling reduction exceeding 80%, it is difficult to perform the cold rolling due to the excessive cold rolling force, and therefore this is set to as upper limit. A more preferable range thereof is 45% to 75%. As long as the cumulative rolling reduction is in the range described above, the effects of the embodiment are exhibited without particularly specifying the number of rolling passes and the rolling reduction of each pass.

In the embodiment, the diameter of a work roll when performing the cold rolling (roll diameter) is set to be equal to or smaller than 1400 mm. The diameter thereof is desirably equal to or smaller than 1200 mm and more desirably equal to or smaller than 1000 mm. The reasons thereof are because the kinds of strain introduced vary depending on the roll diameters and shear strain is easily introduced when using a roll with a small diameter. Since the recrystallization easily occurs from a shear band, the recrystallization rapidly occurs when using a steel sheet which is subjected to the rolling with the roll with a small diameter which forms many shear bands. That is, by performing the rolling using the work roll with the small roll diameter, it is possible to start the recrystallization before the oxides are formed.

Herein, when setting an entering sheet thickness before an initial pass in each rolling process (for example, cold rolling process) as a reference, the cumulative rolling reduction is a percentage of cumulative rolling reduction with respect to the reference (difference between the entering sheet thickness before the initial pass in the rolling and an existing sheet thickness after a final pass in the rolling).

The effects of the embodiment are exhibited without particularly specifying a heating rate in a case where the sheet passes through the plating line. However, the heating rate which is less than 0.5° C./sec is not preferable as the productivity is significantly degraded. In addition, the heating rate exceeding 100° C./sec is not economically preferable, since it causes excessive equipment investment.

In the embodiment, the steel sheet is retained in a temperature range of 550° C. to 750° C. when heating to the annealing temperature in a case where the sheet passes through the plating line, for 20 seconds or longer. This is because the recrystallization sufficiently proceeds in this temperature range, whereas oxide formation is delayed compared to the recrystallization. The oxides containing Si, Mn, or Al independently or in combination with each other, tend to be formed on the grain boundary of the ferrite on the steel sheet surface firstly, and use the grain boundary of fine ferrite formed by the recrystallization as a generation site. That is, after performing the cold rolling, by performing the retaining in this temperature range, it is possible to start the recrystallization before forming the oxides. It is not desirable to set the temperature in the retaining to be lower than 550° C., as a long time is necessary for the recrystallization. It is not desirable to set the temperature in the retaining to be higher than 750° C., as the oxides are rapidly formed and the oxides on the grain are formed on the grain boundary in the middle of the recrystallization or grain growth. However, once after the oxides are formed, the retaining for a long time may be performed in the temperature range of higher than 750° C. for the microstructure control. The same effect is obtained with the structure having the ferrite as a primary phase or with the structure having the bainite or martensite as a primary phase. It is not desirable when the retaining time at 550° C. to 750° C. is shorter than 20 seconds, as the recrystallization does not sufficiently proceed. On the other hand, retaining for longer than 2000 seconds is not preferable as not only is the productivity degraded, but also the formed oxides are thick, causing the non-plating. The retaining is preferably performed for 40 seconds to 500 seconds. The retaining does not only represent isothermal maintaining, and may include change in the temperature such as heating or maintaining in this temperature range.

Since the oxides are formed on the ferrite grain boundary in priority, the oxides have a network structure, in many cases.

After the retaining, the annealing is performed. In order to cause the oxides containing one or more of the oxides containing Si, Mn, or Al independently or in combination with each other to be contained in the plated layer, in the annealing process of a continuous galvanizing line (CGL), after forming the oxides of oxidizable elements on the steel sheet surface, it is necessary to perform the plating and to introduce the oxides into the plated layer. For forming the oxides of Si Mn, or Al on the steel sheet surface, the atmosphere of the annealing process in the continuous galvanizing line is controlled to be in a suitable range. That is, it is particularly important to manage the $H_2$ concentration and the dew point in the annealing atmosphere with the annealing temperature. Herein, in the embodiment, the annealing is performed in conditions of an $N_2$ atmosphere in which the $H_2$ concentration is equal to or less than 20 volume %, the dew point which is equal to or higher than −20° C., and the maximum heating temperature of 750° C. to 900° C. If the maximum heating temperature is lower than 750° C., excessive time is necessary to reform a solid solution of carbides formed at the time of the hot rolling, the carbides or a part thereof remain, or the martensite or the bainite is not sufficiently obtained after the coiling, and accordingly it is difficult to secure the strength of equal to or greater than 980 MPa. On the other hand, heating at an excessively high temperature is not only not economically preferable as it causes increase in costs, but also causes difficulties in which the sheet shape at the time of passing the sheet at the high temperature is degraded or the lifetime of the roll is reduced, and therefore the upper limit of the maximum heating temperature is set to 900° C. The heat treatment time in this temperature range is desirable 10 seconds or longer to dissolve the carbides. In contrast, a heat treatment time which is longer than 1000 seconds is not economically preferable as it causes an increase in cost. The heat treatment time is more desirably equal to or shorter than 600 seconds. Also, for the heat treatment, retaining at the maximum temperature may be performed isothermally, or the cooling may be started directly after performing gradient heating to cause the temperature to reach the maximum heating temperature, for exhibiting the effect of the embodiment. It is not desirable to set the dew point to be lower than −20° C. as the projected area ratio described above exceeds 90%. The $H_2$ concentration exceeding 20 volume % is not desirable as it causes costs to significantly increase.

The lower limit of the $H_2$ concentration is desirably 0.05 volume % to set the furnace atmosphere to a reduction atmosphere for Fe. The dew point is desirably set to be equal to or lower than 50° C. for suppressing the oxidation of Fe in the furnace. The dew point is more desirably set to be equal to or lower than 40° C. and even more desirably set to be equal to or lower than 30° C.

The ferrite is formed during the annealing at 750° C. to 900° C. or during the cooling from the maximum heating temperature to 650° C. Accordingly, for further improving the elongation, in a case where the ferrite area ratio of the microstructure is set to equal to or more than 40%, the annealing temperature is desirably set to be less than 840° C. By setting the annealing temperature to be less than 840° C., a ferrite fraction at the time of the annealing can become great, and accordingly the structure containing much ferrite can be obtained even after cooling. In addition, the structure which was the austenite at the time of the annealing is transformed into any of martensite, bainite, residual austenite, and pearlite, after the cooling.

On the other hand, to further improve the hole expandability, in a case where the area ratio of the martensite and bainite of the microstructure is set to be more than 60%, the annealing temperature is desirably set to be equal to or higher than 840° C. By setting the annealing temperature to be equal to or higher than 840° C., the austenite fraction at the time of the annealing can be increased. The austenite is transformed into the bainite or the martensite in the cooling after the annealing, and accordingly the fraction of the bainite and the martensite can become high.

Regarding the annealing before plating, a Sendzimir method of "heating the steel sheet in a non-oxidation atmosphere after degreasing and pickling, annealing in a reduction atmosphere containing $H_2$ and $N_2$, then cooling to the vicinity of a plating bath temperature, and immersing the steel sheet in the plating bath", an all reducing furnace method of "adjusting an atmosphere at the time of annealing, first oxidizing a steel sheet surface, then performing cleaning before plating by the reduction, then immersing the steel sheet in a plating bath", or a flux method of "after performing degreasing and pickling of a steel sheet, performing flux treatment using ammonium chloride or the like and then immersing the steel sheet in a plating bath" may be applied after changing the method if necessary in accordance with processes of the embodiment.

After finishing the annealing, the steel sheet is cooled to a temperature range of 500° C. to 750° C. (first cooling or third cooling). An average cooling rate from the maximum heating temperature of the annealing is set to 1.0° C./sec to 200° C./sec. It is not desirable to set the cooling rate to be lower than 1° C./sec, as the productivity is significantly degraded. On the other hand, since an excessive increase in the cooling rate causes an increase in manufacturing costs, the upper limit is preferably 200° C./sec.

After that, the cooling is performed at a cooling rate which is equal to or higher than 1° C./sec and is faster than the first cooling rate, to a temperature range between a temperature which is lower than a hot dip galvanizing bath temperature by 40° C. and a temperature which is higher than the hot dip galvanizing bath temperature by 50° C. (second cooling). The cooling rate is set to be equal to or higher than 1° C./sec because, if the cooling rate is low, the ferrite or pearlite is excessively generated in the cooling process and accordingly it is difficult to secure the strength of equal to or greater than 980 MPa. Meanwhile, since an excessive increase in the cooling rate increases manufacturing costs, the upper limit is preferably set to 200° C./sec. In the embodiment, the hot dip galvanizing bath temperature is set to be 440° C. to 460° C.

Instead of second cooling, before the immersing the steel sheet in the plating bath, the cooling (fourth cooling) may be performed once to a temperature of 25° C. to 500° C., and then in a case where a cooling stop temperature was lower than the temperature which is lower than a hot dip galvanizing bath temperature by 40° C., the steel sheet may be heated again to the heating range of 350° C. to 500° C. and retained. When the cooling is performed in the temperature range described above, a hard phase such as martensite or bainite is formed from non-transformed austenite during the cooling. After that, by performing the heating again, the hard phase is tempered. The tempering indicates precipitation of carbides, or recovery and rearrangement of dislocation, in the hard phase, and by performing the tempering, the hole expandability, the bendability, or the delayed fracture resistance is improved. The lower limit of the cooling stop temperature is set to 25° C. because excessive cooling requires significant equipment investment. In addition, even if cooling is performed excessively, effect thereof is also saturated. In addition, after the re-heating and before the plating bath immersion, the steel sheet is retained in the temperature range of 350° C. to 500° C. The retaining in this temperature range not only contributes to the tempering of martensite, but also eliminates temperature irregularity of the sheet in the width direction and improves the appearance after plating. In a case where the cooling stop temperature of the fourth cooling was 350° C. to 500° C. the retaining may be performed without performing the re-heating. The time for performing the retaining is desirably set to be equal to or longer than 10 seconds and equal to or shorter than 1000 seconds to obtain the effects thereof. In order to generate the bainite transformation and to stabilize the residual austenite, the retaining time is desirably set to 20 seconds to 750 seconds and more desirably set to 30 seconds to 500 seconds.

After the second cooling or retaining in the temperature range of 350° C. to 500° C., the steel sheet is immersed in the plating bath and hot dip galvanizing is performed. A range of a plating bath immersion sheet temperature (temperature of the steel sheet when immersing the steel sheet in the hot dip galvanizing bath) is set to a temperature range between a temperature lower than a hot dip galvanizing bath temperature by 40° C. and a temperature higher than the hot dip galvanizing bath temperature by 50° C. It is not desirable to set the hot dip galvanizing bath immersion sheet temperature to be lower than the temperature lower than the hot dip galvanizing bath temperature by 40° C., as heat release at the time of hot dip galvanizing bath immersion is great, a part of the molten zinc is solidified, and the plated appearance may be degraded. In a case where the sheet temperature before immersion is lower than the temperature lower than the hot dip galvanizing bath temperature by 40° C., heating may be additionally performed by an arbitrary method before the hot dip galvanizing bath immersion to control the sheet temperature to be equal to or higher than the temperature lower than the hot dip galvanizing bath temperature by 40° C., and then the steel sheet may be immersed in the plating bath. In addition, if the plating bath immersion sheet temperature exceeds the temperature higher than the hot dip galvanizing bath temperature by 50° C., it causes an operational problem accompanying the hot dip galvanizing bath temperature increase. The plating bath may contain Fe, Al, Mg, Mn, Si, Cr, or the like in addition to pure zinc.

If the oxides cover the steel sheet surface, a problem such as non-plating or delay of alloying easily occurs. Particularly, the oxide of zinc exists on the surface of the hot dip galvanizing bath or in the bath. Since the oxide of zinc and the oxides formed on the steel sheet surface have high affinity and the oxide of zinc is easily attached thereto, a problem of non-plating or an appearance defect easily occurs. In the embodiment, since the oxides of Si, Mn, or Al are dispersed in the steel sheet surface, non-plating or delay of alloying easily occurs. In a case of dispersing the oxides to have the projected area ratio of equal to or more than 10% so as to suppress hydrogen embrittlement, the tendency thereof becomes significant. Accordingly, in a case of forming the oxides of the embodiment on the steel sheet surface, molten zinc in the plating bath flows at a jet rate with a flow rate of 10 m/min to 50 m/min, and accordingly the attachment of the steel sheet and the oxide of zinc is prevented, and prevention of non-plating and promotion of alloying are performed. As a result, the oxides can be dispersed in the plated layer. Normally, an oxide film of Zn or Al, which is called scum, floats in the hot dip galvanizing bath, and this causes non-plating or delay of alloying. The present inventors have found that, in a case where the oxides exist on the steel sheet surface, the scum is easily attached at the time of immersion of the steel sheet into the bath, and thus non-plating (defect affecting the steel sheet in the plated layer) is easily generated. The scum attached to the steel sheet does not only cause the non-plating but also delays the alloying. This trend becomes particularly significant in the steel sheet containing a large amount of Si or Mn. A detailed mechanism is not clear, but it is considered that the non-plating or the delay of alloying is promoted by reaction of the oxides of Si or Mn formed on the steel sheet surface and the scum which is the oxides as well. If the flow rate is lower than 10 m/min, the effect of suppressing the non-plating by the jet flow is not obtained, and the oxides are attached to the steel sheet surface, and this causes the appearance defect. On the other hand, if the flow rate exceeds 50 m/min, the effect thereof is saturated and a pattern caused by the flow of zinc is generated, and the appearance defect easily occurs. In addition, excessive equipment investment increases cost. Therefore, the flow rate of the molten zinc in the plating bath is set to 10 m/min to 50 m/min. Herein, a direction of flux of the molten zinc is not particularly limited, and it is only preferable to control a flux magnitude.

After immersion, the steel sheet immersed in the plating bath is taken from the plating bath and wiping is performed as necessary. When wiping is performed with respect to the steel sheet, it is possible to control the amount of plate to be attached to the steel sheet surface (plate attachment amount). The plate attachment amount is not particularly limited, but is desirably set to be equal to or more than 5 g/m$^2$ per one surface from a viewpoint of further increasing the corrosion resistance. In addition, the plate attachment amount is desirably set to be equal to or less than 100 g/m$^2$ per one surface from a viewpoint of further increasing plating adhesion.

In a case of further performing the alloying treatment of the plated layer, it is performed at a temperature equal to or lower than 600° C. Meanwhile, if the temperature is higher than 600° C., carbides are formed to decrease the residual austenite volume fraction, excellent ductility is difficult to secure, the hard phase such as martensite is softened, or a large amount of pearlite is generated, and accordingly it is difficult to secure a maximum tensile strength of equal to or greater than 980 MPa. On the other hand, it is not preferable to set the alloying treatment temperature to be lower than 460° C., as the alloying is delayed and the productivity is degraded. In addition, if the alloying treatment temperature exceeds 600° C., the Fe content in the plated layer may exceed 15 mass %, and accordingly, adhesion of the plated layer is lost. In a case of not performing the alloying treatment, the Fe content in the plated layer does not exceed 15 mass % as long as the conditions of the embodiment are satisfied.

Figure 3A:
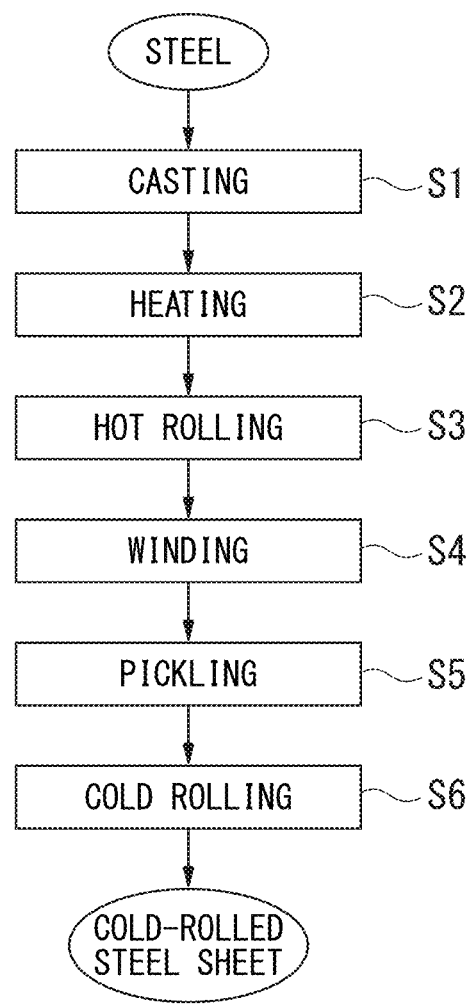
FIG. 3A is a flowchart showing a manufacturing method of a hot-dip galvanized steel sheet according to one embodiment of the present invention.
Figure 3B:
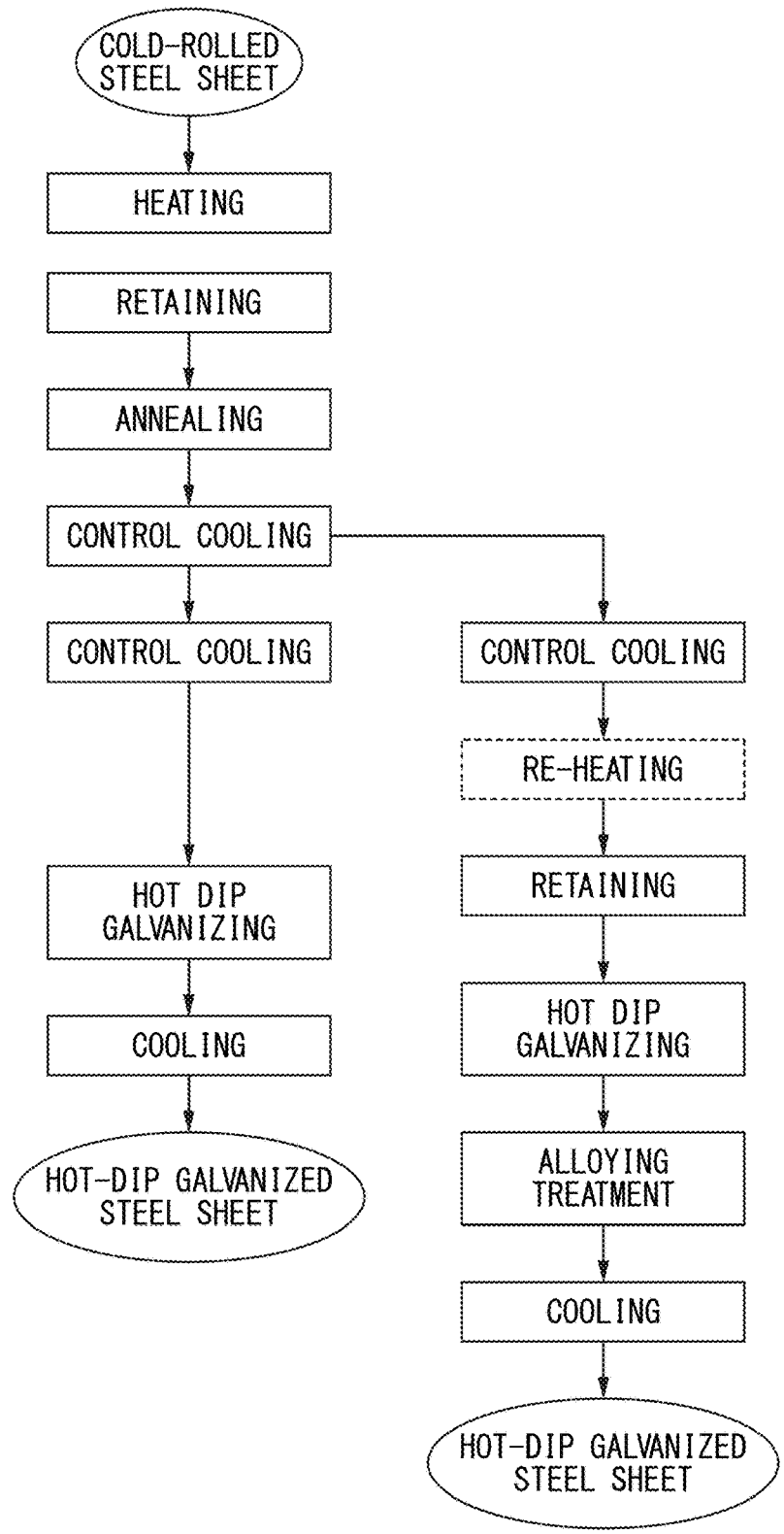
FIG. 3B is a flowchart (sequent to FIG. 3A) showing a manufacturing method of a hot-dip galvanized steel sheet according to one embodiment of the present invention.

FIG. 3A and FIG. 3B show flowcharts of the manufacturing method according to one embodiment of the present invention described above.

In addition, skin pass rolling may be performed to correct the steel sheet shape and to realize an improvement of ductility by moving dislocation introduction. Rolling reduction of the skin pass rolling after the heat treatment is preferably in a range of 0.1% to 1.5%. If the rolling reduction is less than 0.1%, the effect thereof is slight and the control is difficult as well, and therefore this is set as the lower limit. If the rolling reduction exceeds 1.5%, the productivity significantly decreases and therefore this is set as the upper limit. The skin pass may be performed in-line or off-line. In addition, the skin pass with the target rolling reduction may be performed at one time or may be performed by being divided into several times.

The material of the hot-dip galvanized steel sheet of the present invention is, in principle, manufactured by performing refining, steelmaking, casting, hot rolling, and cold rolling processes which are typical steel manufacturing processes, but the effect of the present invention can be obtained even with the product manufactured by omitting a part or all of the processes as long as the conditions according to the present invention are satisfied.

EXAMPLES

Next, the present invention will be described in more detail with examples.

Slabs including components shown in Table 1 were heated to 1200° C., the hot rolling was performed under hot rolling conditions disclosed in Table 2-1 to Table 2-4, and after performing water cooling with a water cooling zone, coiling treatment was performed at temperatures shown in Table 2-1 to Table 2-4. The thickness of the hot-rolled sheets was set in a range of 2 mm to 4.5 mm. After pickling the hot-rolled sheets, the cold rolling was performed at a predetermined cold rolling reduction so as to set the sheet thickness after the cold rolling to 1.2 mm, and the cold-rolled sheets were obtained. After that, the cold-rolled sheets were retained under the conditions of Table 2-1 to Table 2-4 in a temperature range of 550° C. to 750° C. in continuous galvannealing equipment under the conditions shown in Table 2-1 to Table 2-4, then perform annealing, cooling, and if necessary, re-heating and were immersed in the hot dip galvanizing bath which was controlled to have predetermined conditions, and then were cooled to a room temperature (25° C.). An effective Al concentration in the plating bath was set to a range of 0.09 mass % to 0.17 mass %. A part of the steel sheet was immersed in the hot dip galvanizing bath, then was subjected to the alloying treatment under the various conditions, and was cooled to room temperature. A coating weight at that time was set to approximately 35 g/m² for both surfaces. Lastly, the skin pass rolling was performed for the obtained steel sheets with a rolling reduction of 0.4%.

The properties of the steel sheet manufactured under the conditions described above are shown in Table 3-1 to Table 3-4.

In the tensile test, a JIS No. 5 test piece was collected as a sample from the sheet having a thickness of 1.2 mm in a direction orthogonal to the rolling direction, and the tensile property was evaluated based on JIS Z2241: 2011.

The observation of the oxides in the plated layer was performed by performing structure observation with the cross section of the hot-dip galvanized steel sheet. After processing the cross section of the hot-dip galvanized steel sheet surface layer into thin flakes so as to contain the plated layer with the focus ion beam processing device, the observation by FE-TEM and the composition analysis by energy dispersive X-ray spectrometry (EDX) were performed. The observation was performed at 5 visual fields at a magnification of 10,000-fold to 50,000-fold, and the composition or the area ratio was determined.

The Fe and an Al content in the plated layer was measured by dissolving the plated layer in a 5% HCl aqueous solution to which an inhibitor was added, removing non-dissolved oxides, and then performing ICP emission analysis of a solution. Three samples were measured and the average value was set to Fe % of the plated layer.

The evaluation of the composition or the area ratio of the oxides can be performed by performing the structure observation with the cross section of the hot-dip galvanized steel sheet. For example, there is a method of processing the cross section of the steel sheet into thin flakes so as to contain the plated layer with the focus ion beam (FIB) processing device, and then performing the observation with field emission transmission electron microscopy (FE-TEM) and composition analysis with energy dispersive X-ray spectrometry (EDX). After manufacturing samples for observation with the FIB processing device, the oxides were observed with FE-TEM at a magnification of 50,000-fold. In addition, by analyzing the oxides with EDX, the oxides could be identified.

In order to cause the oxides containing one or more of the oxides containing Si, Mn, or Al independently or in combination with each other to be contained in the plated layer, after forming the oxides of oxidizable elements on the steel sheet surface in the annealing process of the CGL, it is necessary to perform the plating and to introduce the oxides into the plated layer.

Next, in order to evaluate the delayed fracture resistance, test piece manufacturing by a U bending test and a delayed fracture resistance test by electrolytic charge were performed. The delayed fracture resistance of the hot-dip galvanized steel sheet manufactured based on the method of the present invention was evaluated based on the method disclosed in Non-Patent Document 3.

In detail, after performing mechanical cutting of the steel sheet, the cross section was subjected to mechanical grinding, and the U bending test was performed at 10R. A strain gauge was attached to the center of the obtained test piece, and both ends of the test piece were compressed with the bolt to apply stress. The applied stress was calculated by the strain of the monitored strain gauge. For load stress, the stress corresponding to 0.7 of TS was applied, that is, a stress of 700 MPa in a case of the steel sheet having the TS of 980 MPa class, a stress of 840 MPa in a case of the steel sheet having the TS of 1180 MPa class, and a stress of 925 MPa in a case of the steel sheet having the TS of 1320 MPa class. This is because it is considered that the residual stress introduced at the time of formation has a relationship with the TS of the steel sheet.

Further, the hole expandability was evaluated based on JFS T1001.

The obtained U bending test piece was immersed in an ammonium thiocyanate solution, the steel sheet was set as a cathode and a platinum electrode was set to an anode, an electric current was flowed at a current density of 0.1 mA/cm$^2$, and an electrolytic charge test was performed for 2 hours. Hydrogen generated in the electrolytic charge test may enter the steel sheet to cause delayed fracture. After the electrolytic charge test, the test piece was taken from the solution and the center part of the U bending test piece was visually observed to inspect for presence and absence of cracks. However, the plated layer may be cracked at the time of the U bending test, and when observing the surface after the electrolytic charge test, the cracks thereof may be incorrectly determined as the cracks generated by the delayed fracture. Herein, after the delayed fracture test, the plated layer was dissolved in the 5% HCl aqueous solution to which an inhibitor was added, and presence and absence of the cracks on the steel sheet surface were observed. Since great stress is applied to a bending processed part, if cracking is generated, proceeding thereof is rapid. Accordingly, in the examples, in a case where the cracks were present, all the cracks became large opening cracks, and presence and absence of the cracks could be easily visually determined. In the examples, by using a magnifying glass or a stereomicroscope, the test pieces were carefully observed, the presence and absence of the cracks were confirmed again, and it was confirmed that there were no fine cracks if there were no opening cracks.

In results of delayed fracture test shown in Table 3-1 to Table 3-4, "GOOD" indicates that no cracks were generated on the end portion and "BAD" indicates cracks generated on the end portion.

The plating properties were evaluated as follows.
GOOD: no non-plated part
BAD: non-plated part observed
Powdering resistance was evaluated by determining whether or not powdering occurred, when performing pressing.
GOOD: no powdering occurred
BAD: powdering occurred
In an example including the non-plated part, sufficient adhesion of the plated layer was not obtained.

The measured tensile strength, delayed fracture resistance, plating properties, and Fe % in the plated layer are shown in Table 3-1 to Table 3-4. It is found that all of the steel sheets of the present invention have high strength of equal to or greater than MPa and have the excellent delayed fracture resistance and the plating properties (non-plating and powdering resistance).

On the other hand, in the examples in which any of conditions is out of the range of the present invention, at least one of the tensile strength, the delayed fracture resistance, and the plating properties (non-plating and powdering resistance) is degraded.

In an example in which the cold rolling reduction was set to equal to or more than 90%, the sheet was broken in the middle of the process and the sheet could not passed. In addition, in an example in which the cold rolling reduction was set to less than 30%, the sheet shape was not stable, difficulties occurred at the time of passing the sheet, and therefore the sheet passing was stopped. Since both steel sheets could not be evaluated, the results thereof are not shown in Tables.

The remainder of the components of Table 1 indicates Fe and unavoidable impurities, and "-" indicates "not detected". Underlined values in Tables indicate values out of the range of the present invention. "*1", "*2", "*3", and "*4" in Tables 2 and 3 are as the description in the lower portion of Table 3-1. In addition, GI in Tables indicates the hot-dip galvanized steel sheet including the hot-dip galvanized layer, and GA indicates the hot-dip galvanized steel sheet including the galvannealed layer, that is, the galvannealed steel sheet.

TABLE 1

| | | CHEMICAL COMPONENT (mass %) | | | | | | | | | |
|---|---|---|---|---|---|---|---|---|---|---|---|
| STEEL TYPE | Ar3/° C. | C | Si | Mn | P | S | N | Al | O | Ti | Nb | B |
| A | 649 | 0.155 | 0.54 | 2.39 | 0.012 | 0.0017 | 0.0046 | 0.029 | 0.0016 | — | — | — |
| B | 665 | 0.176 | 1.12 | 2.34 | 0.007 | 0.0024 | 0.0052 | 0.032 | 0.0011 | — | — | — |
| C | 678 | 0.079 | 0.74 | 2.41 | 0.024 | 0.0036 | 0.0012 | 0.039 | 0.0024 | 0.043 | — | 0.0024 |
| D | 670 | 0.082 | 0.69 | 2.06 | 0.013 | 0.0019 | 0.0035 | 0.021 | 0.0031 | — | 0.032 | — |
| E | 610 | 0.191 | 0.55 | 2.69 | 0.010 | 0.0028 | 0.0029 | 0.026 | 0.0029 | — | — | — |
| F | 629 | 0.189 | 0.72 | 2.06 | 0.011 | 0.0020 | 0.0027 | 0.468 | 0.0025 | — | — | — |
| G | 659 | 0.142 | 0.74 | 2.39 | 0.008 | 0.0019 | 0.0019 | 0.026 | 0.0019 | 0.046 | — | 0.0017 |
| H | 658 | 0.177 | 0.52 | 2.03 | 0.006 | 0.0016 | 0.0038 | 0.024 | 0.0007 | — | — | — |
| I | 655 | 0.139 | 0.64 | 2.13 | 0.014 | 0.0039 | 0.0042 | 0.023 | 0.0026 | 0.033 | 0.013 | 0.0009 |
| J | 645 | 0.183 | 0.71 | 2.01 | 0.009 | 0.0032 | 0.0024 | 0.034 | 0.0015 | — | — | — |
| K | 618 | 0.198 | 0.52 | 2.56 | 0.013 | 0.0034 | 0.0026 | 0.004 | 0.0010 | — | — | — |
| L | 618 | 0.195 | 0.66 | 2.62 | 0.011 | 0.0008 | 0.0042 | 0.029 | 0.0016 | — | — | — |
| M | 611 | 0.192 | 0.58 | 2.68 | 0.009 | 0.0034 | 0.0026 | 0.017 | 0.0018 | — | — | — |
| N | 618 | 0.196 | 0.67 | 2.62 | 0.011 | 0.0019 | 0.0029 | 0.433 | 0.0022 | — | — | — |
| O | 609 | 0.242 | 1.02 | 2.68 | 0.009 | 0.0016 | 0.0033 | 0.027 | 0.0019 | — | — | — |
| P | 640 | 0.198 | 0.82 | 2.12 | 0.011 | 0.0019 | 0.0021 | 0.043 | 0.0021 | 0.039 | 0.023 | 0.0013 |
| Q | 679 | 0.098 | 0.72 | 2.33 | 0.004 | 0.0024 | 0.0020 | 0.019 | 0.0012 | — | — | — |
| R | 693 | 0.155 | 1.32 | 2.19 | 0.016 | 0.0029 | 0.0024 | 0.032 | 0.0015 | — | — | — |
| S | 657 | 0.119 | 0.52 | 2.42 | 0.027 | 0.0039 | 0.0022 | 0.027 | 0.0032 | — | — | — |
| T | 692 | 0.125 | 0.56 | 2.03 | 0.009 | 0.0045 | 0.0026 | 0.026 | 0.0008 | — | — | 0.0039 |
| U | 649 | 0.175 | 0.74 | 2.39 | 0.012 | 0.0011 | 0.0027 | 0.028 | 0.0023 | 0.049 | — | — |
| V | 673 | 0.182 | 0.56 | 2.04 | 0.016 | 0.0009 | 0.0018 | 0.340 | 0.0024 | — | 0.038 | — |
| W | 646 | 0.177 | 0.82 | 2.43 | 0.010 | 0.0015 | 0.0016 | 0.035 | 0.0018 | — | — | — |
| X | 643 | 0.182 | 0.81 | 1.96 | 0.017 | 0.0017 | 0.0016 | 0.036 | 0.0019 | — | — | — |
| Y | 641 | 0.179 | 0.69 | 2.23 | 0.012 | 0.0053 | 0.0009 | 0.006 | 0.0019 | — | — | — |
| Z | 653 | 0.180 | 0.72 | 1.81 | 0.008 | 0.0047 | 0.0011 | 0.024 | 0.0034 | — | — | — |

TABLE 1-continued

| CHEMICAL COMPONENT (mass %) | | | | | | | | | | | |
|---|---|---|---|---|---|---|---|---|---|---|---|
| AA | 641 | 0.177 | 0.54 | 2.39 | 0.009 | 0.0025 | 0.0019 | 0.035 | 0.0007 | — | — | — |
| AB | 654 | 0.201 | 1.16 | 2.39 | 0.010 | 0.0026 | 0.0028 | 0.036 | 0.0042 | 0.026 | — | 0.0012 |
| AC | 604 | 0.195 | 0.54 | 2.46 | 0.011 | 0.0031 | 0.0044 | 0.020 | 0.0023 | — | — | — |
| AD | 637 | 0.206 | 0.53 | 2.20 | 0.013 | 0.0037 | 0.0031 | 0.014 | 0.0032 | — | — | — |
| AE | 636 | 0.256 | 0.75 | 2.24 | 0.017 | 0.0019 | 0.0052 | 0.033 | 0.0030 | — | — | — |
| AF | 617 | 0.198 | 1.64 | 2.98 | 0.008 | 0.0024 | 0.0019 | 0.027 | 0.0008 | — | — | — |
| a | 502 | <u>0.623</u> | 1.19 | 2.56 | 0.011 | 0.0020 | 0.0019 | 0.031 | 0.0035 | — | — | — |
| b | 838 | <u>0.041</u> | 0.55 | <u>0.74</u> | 0.010 | 0.0058 | 0.0022 | 0.030 | 0.0029 | — | — | — |
| c | 764 | 0.185 | <u>4.21</u> | 2.35 | 0.019 | 0.0035 | 0.0017 | 0.021 | 0.0027 | — | — | — |
| d | 681 | 0.185 | <u>0.23</u> | 1.82 | 0.009 | 0.0034 | 0.0035 | 0.017 | 0.0025 | — | — | — |
| e | 467 | 0.191 | 0.53 | <u>4.23</u> | 0.022 | 0.0042 | 0.0012 | 0.023 | 0.0018 | — | — | — |
| f | 749 | 0.176 | 0.54 | <u>1.22</u> | 0.014 | 0.0019 | 0.0036 | 0.032 | 0.0023 | — | — | — |
| g | 616 | 0.231 | 1.09 | 2.67 | <u>0.089</u> | 0.0042 | 0.0036 | 0.029 | 0.0012 | — | — | — |
| h | 628 | 0.192 | 0.92 | 2.62 | 0.009 | <u>0.0191</u> | 0.0042 | 0.014 | 0.0034 | — | — | — |
| i | 633 | 0.203 | 0.98 | 2.55 | 0.015 | 0.0021 | <u>0.0320</u> | 0.034 | 0.0009 | — | — | — |
| j | 668 | 0.110 | 0.95 | 2.49 | 0.023 | 0.0029 | 0.0027 | <u>3.262</u> | 0.0011 | — | — | — |
| k | 650 | 0.209 | 1.03 | 2.36 | 0.009 | 0.0033 | 0.0024 | 0.039 | <u>0.0182</u> | — | — | — |
| l | 646 | 0.184 | 1.12 | 2.52 | 0.012 | 0.0024 | 0.0019 | 0.043 | 0.0006 | <u>0.421</u> | — | — |
| m | 558 | 0.246 | 0.57 | 2.45 | 0.009 | 0.0033 | 0.0024 | 0.029 | <u>0.0182</u> | — | — | — |
| n | 487 | 0.221 | 0.75 | 2.36 | 0.019 | 0.0016 | 0.0039 | 0.028 | 0.0019 | — | — | — |
| o | 711 | <u>0.039</u> | 0.54 | 2.12 | 0.012 | 0.0034 | 0.0029 | 0.019 | 0.0009 | — | — | — |

| STEEL TYPE | Mg | Rem | Ca | Mo | Cr | Cu | Ni | V | NOTE |
|---|---|---|---|---|---|---|---|---|---|
| A | — | — | — | — | — | — | — | — | STEEL OF PRESENT INVENTION |
| B | — | — | — | — | — | — | — | — | STEEL OF PRESENT INVENTION |
| C | — | — | — | — | — | — | — | — | STEEL OF PRESENT INVENTION |
| D | — | — | — | — | 0.82 | — | — | — | STEEL OF PRESENT INVENTION |
| E | — | — | — | — | — | — | — | — | STEEL OF PRESENT INVENTION |
| F | — | — | — | — | 0.98 | — | — | — | STEEL OF PRESENT INVENTION |
| G | — | — | — | — | — | — | — | — | STEEL OF PRESENT INVENTION |
| H | — | — | — | 0.34 | — | — | — | — | STEEL OF PRESENT INVENTION |
| I | — | — | — | — | 0.56 | — | — | — | STEEL OF PRESENT INVENTION |
| J | — | — | — | — | — | 0.17 | 0.59 | — | STEEL OF PRESENT INVENTION |
| K | — | 0.004 | — | — | — | — | — | — | STEEL OF PRESENT INVENTION |
| L | — | — | 0.005 | — | — | — | — | — | STEEL OF PRESENT INVENTION |
| M | 0.006 | — | — | — | — | — | — | — | STEEL OF PRESENT INVENTION |
| N | — | — | — | — | — | — | — | 0.067 | STEEL OF PRESENT INVENTION |
| O | — | — | — | — | — | — | — | — | STEEL OF PRESENT INVENTION |
| P | — | — | 0.004 | — | 0.62 | — | — | — | STEEL OF PRESENT INVENTION |
| Q | — | — | — | — | — | — | — | — | STEEL OF PRESENT INVENTION |
| R | — | — | — | — | — | — | — | — | STEEL OF PRESENT INVENTION |
| S | — | — | — | — | — | — | — | — | STEEL OF PRESENT INVENTION |
| T | — | — | — | — | — | — | — | — | STEEL OF PRESENT INVENTION |
| U | — | — | — | — | — | — | — | — | STEEL OF PRESENT INVENTION |
| V | — | — | — | — | — | — | — | — | STEEL OF PRESENT INVENTION |
| W | — | — | — | 0.03 | — | — | — | — | STEEL OF PRESENT INVENTION |
| X | 0.004 | — | — | — | 0.98 | — | — | — | STEEL OF PRESENT INVENTION |
| Y | — | 0.006 | — | — | — | — | 0.42 | — | STEEL OF PRESENT INVENTION |
| Z | — | — | 0.005 | — | — | 0.81 | 0.21 | — | STEEL OF PRESENT INVENTION |
| AA | — | — | — | — | — | — | — | 0.062 | STEEL OF PRESENT INVENTION |
| AB | — | — | — | — | — | — | — | — | STEEL OF PRESENT INVENTION |
| AC | — | — | — | — | 0.55 | — | — | — | STEEL OF PRESENT INVENTION |
| AD | — | — | — | 0.26 | — | — | — | — | STEEL OF PRESENT INVENTION |
| AE | — | — | — | — | — | — | — | — | STEEL OF PRESENT INVENTION |
| AF | — | — | — | — | — | — | — | — | STEEL OF PRESENT INVENTION |
| a | — | — | — | — | — | — | — | — | STEEL OF COMPARATIVE EXAMPLE |
| b | — | — | — | — | — | — | — | — | STEEL OF COMPARATIVE EXAMPLE |
| c | — | — | — | — | — | — | — | — | STEEL OF COMPARATIVE EXAMPLE |
| d | — | — | — | — | — | — | — | — | STEEL OF COMPARATIVE EXAMPLE |
| e | — | — | — | — | — | — | — | — | STEEL OF COMPARATIVE EXAMPLE |
| f | — | — | — | — | — | — | — | — | STEEL OF COMPARATIVE EXAMPLE |
| g | — | — | — | — | — | — | — | — | STEEL OF COMPARATIVE EXAMPLE |
| h | — | — | — | — | — | — | — | — | STEEL OF COMPARATIVE EXAMPLE |
| i | — | — | — | — | — | — | — | — | STEEL OF COMPARATIVE EXAMPLE |
| j | — | — | — | — | — | — | — | — | STEEL OF COMPARATIVE EXAMPLE |
| k | — | — | — | — | — | — | — | — | STEEL OF COMPARATIVE EXAMPLE |
| l | — | — | — | — | — | — | — | — | STEEL OF COMPARATIVE EXAMPLE |
| m | — | — | — | <u>1.23</u> | — | — | — | — | STEEL OF COMPARATIVE EXAMPLE |
| n | — | — | — | — | <u>3.26</u> | — | — | — | STEEL OF COMPARATIVE EXAMPLE |
| o | — | — | — | — | — | — | — | — | STEEL OF COMPARATIVE EXAMPLE |

UNDERLINED VALUES INDICATE VALUES OUT OF THE RANGE OF THE PRESENT INVENTION.

TABLE 2

| STEEL NO. | STEEL TYPE | Ar3/ °C. | HEATING TEMPERATURE/ °C. | FINISH ROLLING TEMPERATURE/ °C. | COILING TEMPERATURE/ °C. | ROLL DIAMETER/ mm | COLD ROLLING RATIO/% | RETAINING TIME AT 550° C. TO 750° C./s | ANNEALING TEMPERATURE/ °C. | MAINTAINING TIME AT THE TIME OF ANNEALING/s |
|---|---|---|---|---|---|---|---|---|---|---|
| 1 | A | 649 | 1220 | 920 | 660 | 1100 | 60 | 160 | 800 | 100 |
| 2 | A | 649 | 1210 | 900 | 650 | 1100 | 60 | 160 | 820 | 90 |
| 3 | A | 649 | 1190 | 890 | 640 | 1100 | 60 | <u>5</u> | 770 | 90 |
| 4 | A | 649 | 1180 | 900 | 630 | 1100 | 60 | 450 | <u>690</u> | 200 |
| 5 | A | 649 | 1200 | 910 | 590 | 1100 | 60 | 120 | 800 | <u>5</u> |
| 6 | A | 649 | 1170 | 930 | 480 | 1100 | 60 | 320 | 810 | 300 |
| 7 | A | 649 | 1220 | 940 | 670 | 1100 | 60 | 130 | 810 | 120 |
| 8 | A | 649 | 1260 | 920 | 650 | <u>1700</u> | 60 | 120 | 830 | 120 |
| 9 | A | 649 | 1210 | 890 | 630 | 1100 | 60 | 100 | 800 | 90 |
| 10 | A | 649 | 1200 | 890 | 600 | 1100 | 60 | 120 | 800 | 100 |
| 11 | A | 649 | 1250 | 900 | 620 | <u>1800</u> | 60 | 120 | 800 | 120 |
| 12 | A | 649 | 1210 | 910 | <u>25</u> | 1200 | *4 | *4 | *4 | *4 |
| 13 | A | 649 | 1220 | 900 | 610 | 1000 | 60 | 130 | 810 | 120 |
| 14 | B | 665 | 1230 | 950 | 620 | 900 | 60 | 160 | 820 | 90 |
| 15 | B | 665 | 1230 | 920 | 580 | 900 | 60 | 160 | 810 | 90 |
| 16 | C | 678 | 1250 | 920 | 530 | 1000 | 60 | 120 | 835 | 120 |
| 17 | C | 678 | 1260 | 910 | 540 | 1000 | 60 | 120 | 830 | 110 |
| 18 | C | 678 | 1250 | 890 | 500 | 1000 | 60 | <u>5</u> | 830 | 120 |
| 19 | C | 678 | 1260 | 900 | 510 | 1000 | 60 | 170 | <u>690</u> | 10 |
| 20 | C | 678 | 1240 | 910 | 520 | 1000 | 60 | 120 | 830 | 120 |
| 21 | C | 678 | 1220 | 930 | 590 | 1000 | 60 | 150 | 820 | 120 |
| 22 | C | 678 | 1270 | 890 | 510 | 1000 | 60 | 140 | 830 | 100 |
| 23 | C | 678 | 1240 | 890 | 620 | 1000 | 60 | 160 | 820 | 100 |
| 24 | C | 678 | 1250 | 900 | 510 | 1000 | 60 | 160 | 830 | 100 |
| 25 | C | 678 | 1260 | 900 | 530 | 1000 | 60 | 160 | 830 | 120 |
| 26 | C | 678 | 1260 | 920 | 590 | <u>1700</u> | 60 | 160 | 820 | 100 |
| 27 | C | 678 | 1190 | 890 | <u>150</u> | 1200 | *4 | *4 | *4 | *4 |
| 28 | C | 678 | 1250 | 900 | 580 | 1000 | 60 | 160 | 830 | 100 |
| 29 | D | 670 | 1250 | 910 | 640 | 950 | 60 | 170 | 820 | 130 |
| 30 | E | 610 | 1240 | 900 | 620 | 650 | 60 | 160 | 800 | 120 |
| 31 | E | 610 | 1220 | 910 | 540 | 650 | 60 | 120 | 810 | 90 |
| 32 | E | 610 | 1230 | 930 | 550 | 650 | 60 | <u>4</u> | 820 | 90 |
| 33 | E | 610 | 1220 | 890 | 530 | 650 | 60 | 100 | <u>720</u> | 90 |
| 34 | E | 610 | 1200 | 880 | 520 | 650 | 60 | 120 | 800 | 100 |
| 35 | E | 610 | 1200 | 900 | 600 | 900 | 60 | 120 | 810 | 100 |
| 36 | E | 610 | 1200 | 920 | 550 | 650 | 60 | 120 | 800 | 90 |
| 37 | E | 610 | 1210 | 870 | 600 | 650 | 60 | 100 | 810 | 5 |
| 38 | E | 610 | 1190 | 890 | 630 | 650 | 60 | 120 | 800 | 100 |
| 39 | E | 610 | 1230 | 900 | 550 | 650 | 60 | 130 | 800 | 90 |
| 40 | E | 610 | 1240 | 920 | 590 | <u>1650</u> | 60 | 160 | 810 | 100 |
| 41 | E | 610 | 1230 | 900 | 620 | 1000 | 60 | 120 | 810 | 80 |
| 42 | F | 629 | 1220 | 890 | 530 | 1150 | 60 | 120 | 830 | 150 |
| 43 | G | 659 | 1260 | 920 | 580 | 1150 | 60 | 120 | 800 | 130 |
| 44 | H | 658 | 1220 | 890 | 490 | 1150 | 60 | 130 | 790 | 100 |
| 45 | I | 655 | 1250 | 870 | 630 | 1150 | 50 | 120 | 800 | 100 |
| 46 | I | 655 | 1240 | 940 | 620 | 1150 | 50 | 100 | 800 | 90 |
| 47 | I | 655 | 1260 | 880 | 590 | 1150 | 50 | <u>7</u> | 810 | 90 |
| 48 | I | 655 | 1250 | 890 | 560 | 1150 | 50 | 290 | <u>710</u> | 180 |
| 49 | I | 655 | 1250 | 920 | 600 | 1150 | 50 | 120 | 810 | 120 |
| 50 | I | 655 | 1230 | 950 | 590 | 1000 | 50 | 120 | 820 | 100 |
| 51 | I | 655 | 1240 | 940 | 540 | 1150 | 50 | 100 | 790 | 100 |
| 52 | I | 655 | 1250 | 880 | 600 | 1150 | 50 | 90 | 800 | 150 |
| 53 | I | 655 | 1260 | 860 | 540 | 1150 | 50 | 120 | 800 | 90 |
| 54 | I | 655 | 1280 | 890 | 610 | <u>1800</u> | 50 | 120 | 790 | 130 |
| 55 | I | 655 | 1210 | 940 | <u>240</u> | 1200 | *4 | *4 | *4 | *4 |
| 56 | J | 645 | 1230 | 900 | 640 | 950 | 60 | 120 | 810 | 90 |
| 57 | K | 618 | 1240 | 920 | 580 | 600 | 60 | 100 | 810 | 120 |
| 58 | L | 618 | 1200 | 930 | 620 | 500 | 60 | 90 | 800 | 150 |
| 59 | M | 611 | 1210 | 920 | 600 | 800 | 60 | 120 | 830 | 300 |
| 60 | N | 618 | 1230 | 890 | 670 | 1100 | 60 | 120 | 850 | 120 |
| 61 | O | 609 | 1220 | 900 | 620 | 1100 | 40 | 90 | 800 | 130 |
| 62 | O | 609 | 1240 | 920 | 590 | 1100 | 40 | 90 | 800 | 120 |
| 63 | O | 609 | 1200 | 890 | 600 | 1100 | 40 | <u>7</u> | 800 | 100 |
| 64 | O | 609 | 1180 | 900 | 630 | 1100 | 40 | 210 | <u>710</u> | 90 |
| 65 | O | 609 | 1220 | 900 | 570 | 1100 | 40 | 120 | 810 | 130 |
| 66 | O | 609 | 1220 | 880 | 600 | 1100 | 40 | 150 | 790 | 120 |
| 67 | O | 609 | 1200 | 930 | 630 | 1100 | 40 | 160 | 800 | 150 |
| 68 | O | 609 | 1230 | 920 | 560 | 1100 | 40 | 90 | 790 | 120 |
| 69 | O | 609 | 1200 | 910 | 620 | <u>1700</u> | 40 | 150 | 800 | 120 |
| 70 | P | 640 | 1280 | 910 | 590 | 600 | 40 | 120 | 800 | 120 |

UNDERLINED VALUES INDICATE VALUES OUT OF THE RANGE OF THE PRESENT INVENTION.

TABLE 2-2

| STEEL NO. | STEEL TYPE | Ar3/ °C. | HEATING TEMPERA-TURE/ °C. | FINISH ROLLING TEMPERA-TURE/ °C. | COILING TEMPERA-TURE/ °C. | ROLL DIAMETER/ mm | COLD ROLLING RATIO/% | RETAINING TIME AT 550° C. TO 750° C./s | ANNEALING TEMPERA-TURE/ °C. | MAINTAINING TIME AT THE TIME OF ANNEALING/s |
|---|---|---|---|---|---|---|---|---|---|---|
| 71 | Q | 679 | 1220 | 892 | 540 | 1000 | 60 | 120 | 860 | 60 |
| 72 | Q | 679 | 1200 | 890 | 530 | 1000 | 50 | 120 | 860 | 80 |
| 73 | Q | 679 | 1210 | 911 | 600 | 1000 | 50 | <u>12</u> | 840 | 30 |
| 74 | Q | 679 | 1230 | 906 | 620 | 1000 | 40 | 120 | <u>720</u> | 60 |
| 75 | Q | 679 | 1240 | 942 | 640 | 1000 | 40 | 160 | 780 | <u>5</u> |
| 76 | Q | 679 | 1200 | 855 | 640 | 1000 | 60 | 200 | 855 | 90 |
| 77 | Q | 679 | 1180 | 924 | 630 | 1000 | 70 | 120 | 860 | 340 |
| 78 | Q | 679 | 1200 | 936 | 620 | <u>1800</u> | 60 | 120 | 880 | 120 |
| 79 | Q | 679 | 1220 | 942 | 580 | 1000 | 60 | 120 | 890 | 120 |
| 80 | Q | 679 | 1190 | 905 | 490 | 1000 | 60 | 260 | 865 | 120 |
| 81 | Q | 679 | 1220 | 936 | 600 | 1000 | 60 | 240 | 875 | 60 |
| 82 | Q | 679 | 1230 | 924 | 590 | <u>1700</u> | 60 | 130 | 870 | 150 |
| 83 | R | 693 | 1210 | 906 | 620 | 800 | 60 | 120 | 845 | 35 |
| 84 | R | 693 | 1240 | 920 | 630 | 1000 | 60 | 120 | 860 | 120 |
| 85 | S | 657 | 1200 | 911 | 630 | 1000 | 50 | 100 | 850 | 130 |
| 86 | T | 692 | 1190 | 896 | 570 | 950 | 50 | 90 | 860 | 135 |
| 87 | T | 692 | 1160 | 906 | 560 | 950 | 50 | 120 | 850 | 120 |
| 88 | T | 692 | 1200 | 945 | 620 | 950 | 50 | <u>15</u> | 850 | 120 |
| 89 | T | 692 | 1200 | 852 | 600 | 950 | 50 | 160 | <u>720</u> | 90 |
| 90 | T | 692 | 1250 | 923 | 580 | 950 | 50 | 160 | 850 | <u>5</u> |
| 91 | T | 692 | 1260 | 930 | 540 | 950 | 50 | 120 | 840 | 120 |
| 92 | T | 692 | 1200 | 906 | 490 | 950 | 50 | 120 | 860 | 105 |
| 93 | T | 692 | 1210 | 910 | 590 | <u>1700</u> | 50 | 100 | 850 | 150 |
| 94 | T | 692 | 1230 | 908 | 600 | 950 | 50 | 160 | 840 | 130 |
| 95 | T | 692 | 1200 | 911 | 560 | 950 | 50 | 120 | 850 | 130 |
| 96 | T | 692 | 1210 | 923 | 640 | <u>1800</u> | 50 | 120 | 860 | 120 |
| 97 | T | 692 | 1010 | 625 | 550 | 1100 | 50 | 120 | 860 | 120 |
| 98 | T | 692 | 1220 | 920 | 580 | 900 | 50 | 140 | 870 | 110 |
| 99 | U | 649 | 1270 | 924 | 580 | 600 | 50 | 135 | 850 | 130 |
| 100 | V | 673 | 1200 | 896 | 560 | 800 | 50 | 120 | 845 | 120 |
| 101 | V | 673 | 1240 | 900 | 560 | 800 | 50 | 120 | 845 | 120 |
| 102 | V | 673 | 1230 | 923 | 600 | 800 | 50 | <u>10</u> | 845 | 135 |
| 103 | V | 673 | 1210 | 895 | 590 | 800 | 50 | 130 | <u>680</u> | 120 |
| 104 | V | 673 | 1200 | 911 | 480 | 800 | 50 | 165 | 850 | 130 |
| 105 | V | 673 | 1190 | 926 | 620 | 800 | 50 | 140 | 845 | 120 |
| 106 | V | 673 | 1210 | 920 | 570 | 800 | 50 | 160 | 860 | 120 |
| 107 | V | 673 | 1220 | 924 | 670 | 800 | 50 | 140 | 840 | 90 |
| 108 | W | 646 | 1240 | 906 | 620 | 1050 | 50 | 110 | 860 | 80 |
| 109 | X | 643 | 1250 | 921 | 630 | 1100 | 50 | 90 | 850 | 90 |
| 110 | Y | 641 | 1260 | 895 | 550 | 800 | 50 | 120 | 830 | 110 |
| 111 | Z | 653 | 1270 | 946 | 600 | 950 | 50 | 150 | 845 | 90 |
| 112 | AA | 641 | 1230 | 923 | 570 | 1100 | 50 | 160 | 860 | 150 |
| 113 | AB | 654 | 1290 | 924 | 560 | 1100 | 50 | 120 | 850 | 130 |
| 114 | AB | 654 | 1260 | 919 | 580 | 1100 | 50 | 130 | 840 | 120 |
| 115 | AB | 654 | 1240 | 910 | 600 | 1100 | 50 | <u>6</u> | 870 | 140 |
| 116 | AB | 654 | 1250 | 908 | 610 | 1100 | 50 | 120 | <u>710</u> | 130 |
| 117 | AB | 654 | 1250 | 895 | 590 | 1100 | 50 | 150 | 845 | 120 |
| 118 | AB | 654 | 1260 | 906 | 570 | 1100 | 50 | 120 | 830 | 120 |
| 119 | AB | 654 | 1240 | 921 | 650 | <u>1700</u> | 50 | 120 | 855 | 150 |
| 120 | AB | 654 | 1230 | 956 | 600 | 1100 | 50 | 130 | 845 | 90 |
| 121 | AB | 654 | 1270 | 922 | 640 | 1100 | 50 | 120 | 845 | 100 |
| 122 | AB | 654 | 1250 | 889 | 620 | <u>1800</u> | 50 | 150 | 850 | 120 |
| 123 | AC | 604 | 1240 | 936 | 620 | 800 | 50 | 120 | 845 | 120 |
| 124 | AD | 637 | 1220 | 926 | 610 | 800 | 50 | 120 | 800 | 120 |
| 125 | AE | 636 | 1260 | 951 | 590 | 800 | 50 | 150 | 840 | 90 |
| 126 | AF | 617 | 1220 | 924 | 570 | 800 | 60 | 150 | 810 | 120 |
| 127 | AF | 617 | 1240 | 892 | 640 | 800 | 60 | 150 | 800 | 120 |
| 128 | a | 502 | 1250 | 924 | 540 | 800 | 40 | 200 | 840 | 140 |
| 129 | b | 838 | 1200 | 923 | 560 | 800 | 50 | 240 | 835 | 135 |
| 130 | c | 764 | 1240 | 895 | 580 | 800 | 50 | 120 | 830 | 140 |
| 131 | d | 681 | 1220 | 923 | 600 | 800 | 50 | 150 | 840 | 155 |
| 132 | e | 467 | 1230 | 948 | 680 | 800 | 40 | 150 | 835 | 140 |
| 133 | f | 749 | 1200 | 905 | 640 | 800 | 50 | 130 | 840 | 120 |
| 134 | g | 616 | 1220 | 906 | 560 | 800 | 40 | 120 | 820 | 140 |
| 135 | h | 627 | 1210 | 908 | 550 | 800 | 40 | 150 | 810 | 180 |
| 136 | i | 633 | 1230 | 912 | 620 | 800 | 40 | 120 | 820 | 140 |
| 137 | j | 668 | 1200 | 942 | 630 | 800 | 40 | 120 | 810 | 140 |
| 138 | k | 650 | 1190 | 936 | 640 | 800 | 40 | 120 | 820 | 140 |
| 139 | l | 646 | 1290 | 887 | 540 | 800 | 40 | 340 | 790 | 280 |
| 140 | m | 569 | 1180 | 925 | 620 | 800 | 40 | 120 | 850 | 140 |
| 141 | n | 494 | 1240 | 916 | 600 | 800 | 40 | 120 | 870 | 140 |
| 142 | o | 711 | 1210 | 924 | 620 | 800 | 60 | 120 | 810 | 160 |

UNDERLINED VALUES INDICATE VALUES OUT OF THE RANGE OF THE PRESENT INVENTION.

TABLE 2-3

| STEEL NO. | H₂ CONCENTRATION/ VOLUME % | DEW POINT/ °C | COOLING RATE FROM ANNEALING TO 500° C. TO 750° C./° C./s | COOLING RATE OF SECOND OR FOURTH COOLING/° C./s | COOLING STOP TEMPERATURE/ °C. | RETAINING TEMPERATURE/ °C. | PLATING BATH IMMERSION SHEET TEMPERATURE/ °C. | HOT DIP GALVANIZING BATH TEMPERATURE/ °C. | JET FLOW RATE IN PLATING BATH/ m/min | ALLOYING TEMPERATURE/ °C. |
|---|---|---|---|---|---|---|---|---|---|---|
| 1 | 4 | −15 | 2 | 3 | 460 | *2 | 470 | 450 | 20 | *3 |
| 2 | 2 | −16 | 3 | 32 | 220 | 390 | 460 | 450 | 20 | *3 |
| 3 | 6 | −17 | 2 | 3 | 500 | *2 | 460 | 450 | 20 | *3 |
| 4 | 5 | −8 | 2 | 5 | 480 | *2 | 460 | 445 | 20 | *3 |
| 5 | 5 | −9 | 2 | 5 | 480 | *2 | 460 | 450 | 30 | *3 |
| 6 | 4 | −7 | 0.02 | 3 | 500 | *2 | 470 | 455 | 10 | *3 |
| 7 | 4 | −4 | 2 | 5 | 490 | *2 | 460 | 460 | 20 | *3 |
| 8 | 2 | 3 | 1 | 3 | 500 | *2 | 460 | 440 | 3 | *3 |
| 9 | 3 | −9 | 2 | 3 | 480 | *2 | 460 | 450 | 20 | 520 |
| 10 | 3 | −14 | 1 | 5 | 470 | *2 | 470 | 450 | 15 | 640 |
| 11 | 3 | −6 | 2 | 3 | 500 | *2 | 465 | 440 | 30 | 560 |
| 12 | *4 | *4 | *4 | *4 | *4 | *4 | *4 | *4 | *4 | *4 |
| 13 | 2 | −6 | 2 | 5 | 300 | 320 | 330 | 460 | 20 | 540 |
| 14 | 5 | +10 | 4 | 3 | 500 | *2 | 460 | 460 | 20 | *3 |
| 15 | 1 | −45 | 2 | 5 | 470 | *2 | 450 | 460 | 20 | *3 |
| 16 | 12 | −7 | 1 | 5 | 490 | *2 | 460 | 445 | 20 | *3 |
| 17 | 4 | −7 | 3 | 80 | 180 | 380 | 455 | 455 | 20 | *3 |
| 18 | 5 | −20 | 1 | 3 | 500 | *2 | 455 | 450 | 20 | *3 |
| 19 | 5 | −9 | 2 | 3 | 500 | *2 | 460 | 455 | 15 | *3 |
| 20 | 4 | −7 | 0.04 | 3 | 500 | *2 | 460 | 460 | 20 | *3 |
| 21 | 3 | 5 | 2 | 0.3 | 480 | *2 | 470 | 440 | 20 | *3 |
| 22 | 2 | −5 | 5 | 3 | 480 | *2 | 460 | 450 | 3 | *3 |
| 23 | 3 | −7 | 1 | 8 | 220 | 300 | 350 | 440 | 20 | 520 |
| 24 | 6 | 3 | 1 | 6 | 460 | *2 | 460 | 445 | 20 | *3 |
| 25 | 7 | 5 | 1 | 3 | 500 | *2 | 450 | 450 | 20 | 640 |
| 26 | 3 | −8 | 1 | 5 | 490 | *2 | 450 | 440 | 25 | 570 |
| 27 | *4 | *4 | *4 | *4 | *4 | *4 | *4 | *4 | *4 | *4 |
| 28 | 2 | 5 | 2 | 3 | 25 | 300 | 350 | 450 | 15 | 540 |
| 29 | 1 | −4 | 1 | 3 | 460 | *2 | 455 | 445 | 25 | *3 |
| 30 | 5 | −7 | 5 | 3 | 480 | *2 | 455 | 450 | 20 | *3 |
| 31 | 4 | −4 | 1 | 120 | 25 | *2 | 455 | 450 | 30 | *3 |
| 32 | 8 | −17 | 1 | 3 | 500 | *2 | 455 | 455 | 20 | *3 |
| 33 | 5 | −15 | 1 | 4 | 480 | *2 | 450 | 460 | 20 | *3 |
| 34 | 6 | −5 | 0.04 | 5 | 460 | *2 | 470 | 460 | 20 | *3 |
| 35 | 4 | −7 | 1 | 0.2 | 480 | *2 | 455 | 460 | 20 | *3 |
| 36 | 5 | −7 | 2 | 3 | 500 | *2 | 460 | 455 | 20 | *3 |
| 37 | 3 | −15 | 1 | 5 | 460 | *2 | 450 | 440 | 3 | *3 |
| 38 | 3 | −16 | 5 | 3 | 440 | *2 | 455 | 445 | 20 | 490 |
| 39 | 2 | 1 | 1 | 3 | 450 | *2 | 455 | 450 | 25 | 520 |
| 40 | 3 | −8 | 1 | 5 | 500 | *2 | 455 | 450 | 20 | 610 |
| 41 | 2 | −45 | 1 | 5 | 490 | *2 | 470 | 460 | 20 | 510 |
| 42 | 4 | −8 | 1 | 3 | 490 | *2 | 455 | 445 | 20 | 630 |
| 43 | 5 | 4 | 7 | 4 | 480 | *2 | 460 | 450 | 20 | *3 |
| 44 | 18 | 3 | 2 | 7 | 460 | *2 | 455 | 455 | 20 | *3 |
| 45 | 5 | −8 | 2 | 3 | 470 | *2 | 455 | 450 | 20 | *3 |

TABLE 2-3-continued

| STEEL NO. | H₂ CONCENTRATION/ VOLUME % | DEW POINT/ °C. | COOLING RATE FROM ANNEALING TO 500° C. TO 750° C./° C./s | COOLING RATE OF SECOND OR FOURTH COOLING/° C./s | COOLING STOP TEMPERATURE/ °C. | RETAINING TEMPERATURE/ °C. | PLATING BATH IMMERSION SHEET TEMPERATURE/ °C. | HOT DIP GALVANIZING BATH TEMPERATURE/ °C. | JET FLOW RATE IN PLATING BATH/ m/min | ALLOYING TEMPERATURE/ °C. |
|---|---|---|---|---|---|---|---|---|---|---|
| 46 | 2 | −5 | 2 | 140 | 25 | 350 | 460 | 455 | 20 | *3 |
| 47 | 3 | −10 | 2 | 3 | 500 | *2 | 460 | 455 | 20 | *3 |
| 48 | 3 | −3 | 1 | 5 | 460 | *2 | 440 | 450 | 20 | *3 |
| 49 | 2 | −5 | 0.03 | 6 | 450 | *2 | 470 | 445 | 20 | *3 |
| 50 | 2 | 3 | 2 | 0.2 | 460 | *2 | 450 | 460 | 20 | *3 |
| 51 | 3 | −4 | 2 | 4 | 480 | *2 | 460 | 440 | 1 | *3 |
| 52 | 4 | −15 | 1 | 5 | 460 | *2 | 440 | 460 | 30 | 520 |
| 53 | 5 | 5 | 2 | 11 | 400 | 480 | 455 | 450 | 45 | 650 |
| 54 | 3 | 0 | 2 | 4 | 490 | *2 | 460 | 445 | 30 | 580 |
| 55 | *4 | *4 | *4 | *4 | *4 | *4 | *4 | *4 | *4 | *4 |
| 56 | 2 | 7 | 2 | 4 | 480 | *2 | 460 | 460 | 20 | *3 |
| 57 | 5 | −18 | 1 | 5 | 470 | *2 | 440 | 450 | 15 | *3 |
| 58 | 4 | −19 | 1 | 6 | 460 | *2 | 455 | 450 | 20 | *3 |
| 59 | 3 | −5 | 1 | 5 | 480 | *2 | 460 | 450 | 20 | *3 |
| 60 | 2 | −7 | 12 | 5 | 480 | *2 | 450 | 445 | 20 | *3 |
| 61 | 5 | 10 | 1 | 5 | 480 | *2 | 460 | 460 | 20 | *3 |
| 62 | 3 | 7 | 1 | 34 | 220 | *2 | 460 | 450 | 15 | *3 |
| 63 | 4 | 5 | 1 | 3 | 500 | *2 | 460 | 450 | 20 | *3 |
| 64 | 6 | 4 | 2 | 6 | 460 | *2 | 440 | 460 | 20 | *3 |
| 65 | 7 | 17 | 0.03 | 5 | 480 | *2 | 455 | 450 | 25 | *3 |
| 66 | 5 | 3 | 1 | 7 | 440 | 470 | 460 | 455 | 3 | *3 |
| 67 | 4 | 1 | 2 | 8 | 430 | 480 | 460 | 450 | 20 | 490 |
| 68 | 4 | 8 | 2 | 5 | 490 | *2 | 450 | 445 | 30 | 620 |
| 69 | 5 | 5 | 1 | 6 | 470 | *2 | 455 | 460 | 4 | 540 |
| 70 | 2 | 2 | 2 | 5 | 490 | *2 | 480 | 440 | 20 | *3 |

TABLE 2-4

| STEEL NO. | H₂ CONCENTRATION/ VOLUME % | DEW POINT/ °C | COOLING RATE FROM ANNEALING TO 500° C. TO 750° C./° C./s | COOLING RATE OF SECOND OR FOURTH COOLING/° C./s | COOLING STOP TEMPERATURE/ °C. | RETAINING TEMPERATURE/ °C. | PLATING BATH IMMERSION SHEET TEMPERATURE/ °C. | HOT DIP GALVANIZING BATH TEMPERATURE/ °C. | JET FLOW RATE IN PLATING BATH/ m/min | ALLOYING TEMPERATURE/ °C. |
|---|---|---|---|---|---|---|---|---|---|---|
| 71 | 5 | -15 | 4 | 5 | 480 | *2 | 455 | 450 | 15 | *3 |
| 72 | 4 | -4 | 24 | 42 | 185 | 420 | 450 | 460 | 20 | *3 |
| 73 | 3 | -7 | 4 | 5 | 490 | *2 | 460 | 455 | 20 | *3 |
| 74 | 3 | -8 | 4 | 7 | 440 | *2 | 460 | 450 | 35 | *3 |
| 75 | 2 | -9 | 0.02 | 6 | 450 | *2 | 445 | 455 | 40 | *3 |
| 76 | 4 | -5 | 4 | 5 | 470 | *2 | 440 | 450 | 20 | *3 |
| 77 | 3 | -4 | 4 | 6 | 440 | *2 | 460 | 445 | 3 | *3 |
| 78 | 3 | -3 | 5 | 3 | 500 | *2 | 440 | 445 | 20 | *3 |
| 79 | 15 | -45 | 3 | 5 | 490 | *2 | 470 | 450 | 15 | *3 |
| 80 | 4 | -8 | 3 | 6 | 460 | *2 | 460 | 450 | 20 | 510 |
| 81 | 5 | -6 | 4 | 5 | 480 | *2 | 460 | 450 | 20 | 630 |
| 82 | 3 | -8 | 4 | 5 | 490 | *2 | 455 | 445 | 5 | 550 |
| 83 | 2 | 18 | 4 | 5 | 490 | *2 | 455 | 440 | 25 | *3 |
| 84 | 2 | -36 | 7 | 5 | 500 | *2 | 440 | 460 | 25 | *3 |
| 85 | 14 | 3 | 5 | 2 | 500 | *2 | 470 | 460 | 40 | *3 |
| 86 | 3 | -7 | 4 | 3 | 460 | *2 | 450 | 440 | 25 | *3 |
| 87 | 4 | -4 | 4 | 6 | 200 | 380 | 460 | 460 | 20 | *3 |
| 88 | 2 | 9 | 4 | 56 | 450 | *2 | 460 | 460 | 25 | *3 |
| 89 | 5 | -8 | 4 | 7 | 440 | *2 | 460 | 455 | 15 | *3 |
| 90 | 5 | -6 | 4 | 6 | 440 | *2 | 455 | 460 | 20 | *3 |
| 91 | 3 | -7 | 0.05 | 7 | 460 | *2 | 440 | 450 | 35 | *3 |
| 92 | 2 | -14 | 4 | 6 | 480 | *2 | 460 | 450 | 7 | *3 |
| 93 | 6 | -19 | 4 | 6 | 480 | *2 | 460 | 445 | 40 | 530 |
| 94 | 7 | -10 | 4 | 3 | 500 | *2 | 460 | 440 | 20 | *3 |
| 95 | 2 | -20 | 4 | 7 | 460 | *2 | 460 | 450 | 20 | 620 |
| 96 | 5 | -8 | 5 | 6 | 490 | *2 | 460 | 450 | 20 | 540 |
| 97 | 3 | -12 | 3 | 6 | 500 | *2 | 460 | 455 | 20 | *3 |
| 98 | 3 | -37 | 5 | 7 | 490 | *2 | 470 | 455 | 20 | 640 |
| 99 | 11 | 6 | 4 | 5 | 460 | *2 | 470 | 460 | 25 | *3 |
| 100 | 5 | -17 | 4 | 4 | 480 | *2 | 455 | 450 | 25 | *3 |
| 101 | 3 | -6 | 4 | 105 | 25 | 360 | 455 | 450 | 25 | *3 |
| 102 | 4 | 5 | 4 | 4 | 480 | *2 | 450 | 445 | 25 | *3 |
| 103 | 4 | -4 | 1 | 4 | 490 | *2 | 460 | 455 | 20 | *3 |
| 104 | 2 | -9 | 0.04 | 16 | 420 | *2 | 480 | 440 | 20 | *3 |
| 105 | 5 | -3 | 5 | 5 | 460 | *2 | 470 | 450 | 5 | 520 |
| 106 | 4 | -18 | 4 | 8 | 430 | *2 | 440 | 450 | 15 | *3 |
| 107 | 3 | -17 | 4 | 4 | 460 | *2 | 460 | 440 | 20 | *3 |
| 108 | 4 | -5 | 4 | 3 | 500 | *2 | 460 | 445 | 25 | 620 |
| 109 | 2 | -1 | 5 | 4 | 480 | *2 | 460 | 460 | 20 | *3 |
| 110 | 3 | -9 | 3 | 5 | 460 | *2 | 460 | 455 | 30 | *3 |
| 111 | 5 | -14 | 5 | 5 | 460 | *2 | 455 | 460 | 30 | *3 |
| 112 | 5 | -16 | 4 | 4 | 480 | *2 | 450 | 440 | 25 | *3 |
| 113 | 4 | 3 | 4 | 5 | 500 | *2 | 460 | 455 | 25 | *3 |
| 114 | 7 | 8 | 4 | 84 | 185 | 420 | 460 | 440 | 25 | *3 |
| 115 | 3 | 5 | 5 | 4 | 480 | *2 | 440 | 440 | 20 | *3 |

TABLE 2-4-continued

| STEEL NO. | H₂ CONCENTRATION/ VOLUME % | DEW POINT/ ° C. | COOLING RATE FROM ANNEALING TO 500° C. TO 750° C./° C./s | COOLING RATE OF SECOND OR FOURTH COOLING/° C./s | COOLING STOP TEMPERATURE/ ° C. | RETAINING TEMPERATURE/ ° C. | PLATING BATH IMMERSION SHEET TEMPERATURE/ ° C. | HOT DIP GALVANIZING BATH TEMPERATURE/ ° C. | JET FLOW RATE IN PLATING BATH/ m/min | ALLOYING TEMPERATURE/ ° C. |
|---|---|---|---|---|---|---|---|---|---|---|
| 116 | 5 | 5 | 2 | 4 | 480 | *2 | 470 | 445 | 20 | *3 |
| 117 | 5 | 4 | 0.04 | 4 | 480 | *2 | 455 | 440 | 25 | *3 |
| 118 | 6 | 6 | 5 | 5 | 470 | *2 | 470 | 450 | 2 | *3 |
| 119 | 4 | 8 | 5 | 3 | 490 | *2 | 440 | 460 | 20 | *3 |
| 120 | 5 | 5 | 4 | 4 | 490 | *2 | 460 | 440 | 20 | 500 |
| 121 | 5 | 3 | 5 | 3 | 490 | *2 | 460 | 450 | 25 | 620 |
| 122 | 4 | 10 | 4 | 3 | 500 | *2 | 460 | 460 | 7 | 530 |
| 123 | 3 | −5 | 5 | 5 | 480 | *2 | 450 | 440 | 20 | *3 |
| 124 | 4 | −19 | 4 | 5 | 480 | *2 | 455 | 445 | 20 | *3 |
| 125 | 5 | −14 | 4 | 3 | 490 | *2 | 450 | 460 | 20 | *3 |
| 126 | 2 | −2 | 2 | 8 | 160 | 440 | 460 | 460 | 25 | 480 |
| 127 | 2 | −45 | 2 | 8 | 150 | 450 | 450 | 460 | 25 | 480 |
| 128 | 6 | −13 | 4 | 3 | 500 | *2 | 470 | 440 | 20 | *3 |
| 129 | 4 | −5 | 4 | 7 | 450 | *2 | 460 | 450 | 40 | *3 |
| 130 | 2 | 6 | 4 | 4 | 480 | *2 | 460 | 450 | 45 | *3 |
| 131 | 3 | −19 | 4 | 4 | 480 | *2 | 460 | 455 | 30 | *3 |
| 132 | 5 | −13 | 4 | 4 | 470 | *2 | 450 | 445 | 20 | *3 |
| 133 | 3 | −18 | 4 | 5 | 460 | *2 | 450 | 450 | 25 | *3 |
| 134 | 2 | −15 | 3 | 5 | 470 | *2 | 460 | 450 | 10 | *3 |
| 135 | 3 | −16 | 2 | 5 | 460 | *2 | 470 | 460 | 15 | *3 |
| 136 | 4 | −5 | 3 | 5 | 460 | *2 | 450 | 445 | 20 | *3 |
| 137 | 2 | 5 | 3 | 4 | 460 | *2 | 460 | 450 | 20 | *3 |
| 138 | 4 | −14 | 4 | 5 | 500 | *2 | 460 | 455 | 25 | *3 |
| 139 | 3 | −5 | 3 | 5 | 500 | *2 | 470 | 440 | 15 | *3 |
| 140 | 2 | −5 | 5 | 5 | 480 | *2 | 460 | 450 | 20 | *3 |
| 141 | 2 | −6 | 3 | 4 | 500 | *2 | 460 | 450 | 10 | *3 |
| 142 | 2 | −19 | 2 | 24 | 490 | *2 | 460 | 450 | 20 | 540 |

TABLE 3-1

| STEEL NO. | F*1/% | B/% | M/% | B + M/% | γR/% | P/% | OXIDES IN PLATED LAYER | PROJECTED AREA RATIO/% | YP/ MPa | TS/ MPa |
|---|---|---|---|---|---|---|---|---|---|---|
| 1 | 56 | 12 | 30 | 42 | 2 | 0 | SiO$_2$, Mn$_2$SiO$_4$ | 23 | 602 | 1023 |
| 2 | 56 | 0 | 43 | 43 | 1 | 0 | SiO$_2$, Mn$_2$SiO$_4$ | 26 | 601 | 1031 |
| 3 | 57 | 13 | 29 | 42 | 1 | 0 | SiO$_2$ | <u>7</u> | 593 | 1029 |
| 4 | 100 | 0 | 0 | <u>0</u> | 0 | 0 | SiO$_2$, Mn$_2$SiO$_4$ | 89 | 523 | <u>726</u> |
| 5 | 92 | 5 | 3 | <u>8</u> | 0 | 0 | SiO$_2$, Mn$_2$SiO$_4$ | 29 | 553 | <u>868</u> |
| 6 | 56 | 11 | 0 | <u>11</u> | 0 | <u>33</u> | SiO$_2$, Mn$_2$SiO$_4$ | 38 | 542 | <u>834</u> |
| 7 | 57 | 9 | 32 | 41 | 2 | 0 | SiO$_2$, Mn$_2$SiO$_4$ | 28 | 608 | 1025 |
| 8 | 56 | 12 | 29 | 41 | 3 | 0 | SiO$_2$, Mn$_2$SiO$_4$ | 6 | 567 | 1034 |
| 9 | 55 | 10 | 30 | 40 | 3 | 2 | SiO$_2$, Mn$_2$SiO$_4$ | 29 | 615 | 991 |
| 10 | 54 | 15 | 0 | <u>15</u> | 0 | <u>31</u> | SiO$_2$, Mn$_2$SiO$_4$ | 31 | 568 | <u>835</u> |
| 11 | 53 | 11 | 33 | 44 | 0 | 3 | SiO$_2$, Mn$_2$SiO$_4$ | <u>6</u> | 593 | 1038 |
| 12 | *4 | *4 | *4 | *4 | *4 | *4 | *4 | *4 | *4 | *4 |
| 13 | 55 | 13 | 30 | 43 | 2 | 0 | SiO$_2$, Mn$_2$SiO$_4$ | 33 | 623 | 1027 |
| 14 | 51 | 14 | 31 | 45 | 4 | 0 | SiO$_2$, Mn$_2$SiO$_4$ | 25 | 625 | 1085 |
| 15 | 53 | 11 | 34 | 45 | 2 | 0 | SiO$_2$ | 100 | 633 | 1078 |
| 16 | 62 | 11 | 25 | 36 | 2 | 0 | SiO$_2$, Mn$_2$SiO$_4$ | 33 | 685 | 1010 |
| 17 | 63 | 10 | 25 | 35 | 2 | 0 | SiO$_2$, Mn$_2$SiO$_4$ | 37 | 723 | 995 |
| 18 | 61 | 12 | 24 | 36 | 3 | 0 | SiO$_2$ | <u>4</u> | 676 | 1013 |
| 19 | 100 | 0 | 0 | 0 | 0 | 0 | SiO$_2$, Mn$_2$SiO$_4$ | 35 | 612 | 823 |
| 20 | 68 | 5 | 0 | <u>5</u> | 0 | <u>27</u> | SiO$_2$, Mn$_2$SiO$_4$ | 35 | 605 | <u>834</u> |
| 21 | 55 | 16 | 0 | <u>16</u> | 0 | <u>29</u> | SiO$_2$, Mn$_2$SiO$_4$ | 39 | 624 | <u>856</u> |
| 22 | 63 | 11 | 23 | 34 | 2 | 1 | SiO$_2$, Mn$_2$SiO$_4$ | 29 | 676 | 1009 |
| 23 | 59 | 11 | 28 | 39 | 2 | 0 | SiO$_2$, Mn$_2$SiO$_4$ | 36 | 625 | 1002 |
| 24 | 62 | 9 | 26 | 35 | 1 | 2 | SiO$_2$, Mn$_2$SiO$_4$ | 37 | 682 | 1017 |
| 25 | 60 | 14 | 0 | <u>14</u> | 0 | <u>26</u> | SiO$_2$, Mn$_2$SiO$_4$ | 36 | 593 | <u>886</u> |
| 26 | 63 | 8 | 22 | 30 | 3 | 4 | SiO$_2$, Mn$_2$SiO$_4$ | <u>7</u> | 639 | 1002 |
| 27 | *4 | *4 | *4 | *4 | *4 | *4 | *4 | *4 | *4 | *4 |
| 28 | 61 | 12 | 27 | 39 | 0 | 0 | SiO$_2$, Mn$_2$SiO$_4$ | 42 | 630 | 997 |
| 29 | 55 | 11 | 32 | 43 | 2 | 0 | SiO$_2$, Mn$_2$SiO$_4$ | 35 | 698 | 998 |
| 30 | 49 | 12 | 37 | 49 | 2 | 0 | SiO$_2$, Mn$_2$SiO$_4$ | 33 | 692 | 1223 |
| 31 | 48 | 3 | 48 | 51 | 1 | 0 | SiO$_2$, Mn$_2$SiO$_4$ | 36 | 768 | 1184 |
| 32 | 50 | 3 | 42 | 45 | 5 | 0 | SiO$_2$ | <u>5</u> | 669 | 1239 |
| 33 | 100 | 0 | 0 | <u>0</u> | 0 | 0 | SiO$_2$, Mn$_2$SiO$_4$ | 34 | 524 | <u>832</u> |
| 34 | 63 | 2 | 0 | <u>2</u> | 0 | <u>35</u> | SiO$_2$, Mn$_2$SiO$_4$ | 30 | 519 | <u>861</u> |
| 35 | 58 | 16 | 0 | <u>16</u> | 0 | <u>26</u> | SiO$_2$, Mn$_2$SiO$_4$ | 33 | 586 | <u>872</u> |
| 36 | 48 | 12 | 38 | 50 | 2 | 0 | SiO$_2$, Mn$_2$SiO$_4$ | 42 | 686 | 1226 |
| 37 | 87 | 3 | 8 | <u>11</u> | 2 | 0 | SiO$_2$, Mn$_2$SiO$_4$ | 42 | 583 | <u>926</u> |
| 38 | 47 | 10 | 38 | 48 | 3 | 2 | SiO$_2$, Mn$_2$SiO$_4$ | 36 | 709 | 1189 |
| 39 | 48 | 13 | 10 | 23 | 0 | <u>29</u> | SiO$_2$, Mn$_2$SiO$_4$ | 32 | 601 | <u>938</u> |
| 40 | 49 | 9 | 39 | 48 | 3 | 0 | SiO$_2$, Mn$_2$SiO$_4$ | <u>7</u> | 667 | 1209 |
| 41 | 47 | 10 | 3 | <u>13</u> | 2 | <u>38</u> | SiO$_2$ | 94 | 623 | <u>872</u> |
| 42 | 49 | 16 | 30 | 46 | 5 | 0 | SiO2, Mn2SiO4, Al2O3 | 40 | 682 | 1187 |
| 43 | 48 | 13 | 37 | 50 | 2 | 0 | SiO$_2$, Mn$_2$SiO$_4$ | 35 | 706 | 1209 |
| 44 | 50 | 14 | 35 | 49 | 1 | 0 | SiO$_2$, Mn$_2$SiO$_4$ | 33 | 709 | 1214 |
| 45 | 53 | 17 | 27 | 44 | 3 | 0 | SiO$_2$, Mn$_2$SiO$_4$ | 37 | 749 | 1202 |
| 46 | 52 | 16 | 30 | 46 | 2 | 0 | SiO$_2$, Mn$_2$SiO$_4$ | 33 | 806 | 1231 |
| 47 | 55 | 18 | 27 | 45 | 0 | 0 | SiO$_2$ | <u>9</u> | 846 | 1204 |
| 48 | 100 | 0 | 0 | <u>0</u> | 0 | 0 | SiO$_2$, Mn$_2$SiO$_4$ | 33 | 603 | <u>889</u> |
| 49 | 72 | 5 | 0 | <u>5</u> | 0 | <u>23</u> | SiO$_2$, Mn$_2$SiO$_4$ | 35 | 592 | <u>934</u> |
| 50 | 64 | 11 | 0 | <u>11</u> | 0 | <u>25</u> | SiO$_2$, Mn$_2$SiO$_4$ | 38 | 635 | <u>921</u> |
| 51 | 54 | 19 | 24 | 43 | 3 | 0 | SiO$_2$, Mn$_2$SiO$_4$ | 29 | 785 | 1224 |
| 52 | 54 | 19 | 26 | 45 | 1 | 0 | SiO$_2$, Mn$_2$SiO$_4$ | 30 | 759 | 1213 |
| 53 | 53 | 11 | 0 | <u>11</u> | 0 | <u>36</u> | SiO$_2$, Mn$_2$SiO$_4$ | 36 | 624 | <u>892</u> |
| 54 | 55 | 14 | 27 | 41 | 0 | 4 | SiO$_2$, Mn$_2$SiO$_4$ | <u>8</u> | 693 | 1233 |
| 55 | *4 | *4 | *4 | *4 | *4 | *4 | *4 | *4 | *4 | *4 |
| 56 | 49 | 15 | 35 | 50 | 1 | 0 | SiO$_2$, Mn$_2$SiO$_4$ | 36 | 726 | 1224 |
| 57 | 50 | 16 | 34 | 50 | 0 | 0 | SiO$_2$, Mn$_2$SiO$_4$ | 29 | 705 | 1219 |
| 58 | 49 | 14 | 36 | 50 | 1 | 0 | SiO$_2$, Mn$_2$SiO$_4$ | 44 | 709 | 1202 |
| 59 | 50 | 13 | 36 | 49 | 1 | 0 | SiO$_2$, Mn$_2$SiO$_4$ | 62 | 732 | 1234 |
| 60 | 37 | 15 | 46 | 61 | 2 | 0 | SiO$_2$, Mn$_2$SiO$_4$, Al$_2$O$_3$ | 42 | 662 | 1183 |
| 61 | 43 | 23 | 31 | 54 | 3 | 0 | SiO$_2$, Mn$_2$SiO$_4$ | 35 | 936 | 1354 |
| 62 | 42 | 14 | 42 | 56 | 2 | 0 | SiO$_2$, Mn$_2$SiO$_4$ | 33 | 972 | 1331 |
| 63 | 44 | 16 | 34 | 50 | 6 | 0 | SiO$_2$ | <u>6</u> | 929 | 1369 |
| 64 | 100 | 0 | 0 | <u>0</u> | 0 | 0 | SiO$_2$, Mn$_2$SiO$_4$ | 34 | 609 | <u>882</u> |
| 65 | 71 | 5 | 0 | <u>5</u> | 0 | <u>24</u> | SiO$_2$, Mn$_2$SiO$_4$ | 39 | 624 | <u>962</u> |
| 66 | 42 | 19 | 37 | 56 | 2 | 0 | SiO$_2$, Mn$_2$SiO$_4$ | 32 | 938 | 1352 |
| 67 | 43 | 18 | 38 | 56 | 1 | 0 | SiO$_2$, Mn$_2$SiO$_4$ | 36 | 952 | 1324 |
| 68 | 45 | 16 | 6 | 22 | 0 | <u>33</u> | SiO$_2$, Mn$_2$SiO$_4$ | 38 | 653 | <u>923</u> |

TABLE 3-1-continued

| STEEL NO. | F*1/% | B/% | M/% | B + M/% | γR/% | P/% | OXIDES IN PLATED LAYER | PROJECTED AREA RATIO/% | YP/ MPa | TS/ MPa |
|---|---|---|---|---|---|---|---|---|---|---|
| 69 | 45 | 15 | 37 | 52 | 3 | 0 | SiO$_2$, Mn$_2$SiO$_4$ | <u>7</u> | 849 | 1355 |
| 70 | 44 | 19 | 35 | 54 | 2 | 0 | SiO$_2$, Mn$_2$SiO$_4$ | 29 | 936 | 1342 |

UNDERLINED VALUES INDICATE VALUES OUT OF THE RANGE OF THE PRESENT INVENTION,
F: FERRITE,
B: BAINITE,
γR: RESIDUAL AUSTENITE,
M: MARTENSITE,
P: PEARLITE
*1: IN A CASE WHERE THE STRUCTURE CONTAINS FERRITE AND CARBIDES, THE CARBIDES WERE COUNTED AS FERRITE.
*2 INDICATES THAT RE-HEATING WAS NOT PERFORMED SINCE A SHEET TEMPERATURE IS HIGHER THAN 350° C.
*3 INDICATES THAT ALLOYING TREATMENT IS NOT PERFORMED.
*4 INDICATES THAT COLD ROLLING COULD NOT BE PERFORMED SINCE A COILING TEMPERATURE IS LOW AND STRENGTH OF A HOT-ROLLED SHEET IS EXCESSIVELY GREAT.

TABLE 3-2

| STEEL NO. | F*1/% | B/% | M/% | B + M/% | γR/% | P/% | OXIDES IN PLATED LAYER | PROJECTED AREA RATIO/% | YP/ MPa | TS/ MPa |
|---|---|---|---|---|---|---|---|---|---|---|
| 71 | 19 | 32 | 46 | 78 | 3 | 0 | SiO$_2$, Mn$_2$SiO$_4$ | 26 | 740 | 1030 |
| 72 | 16 | 5 | 77 | 82 | 2 | 0 | SiO$_2$, Mn$_2$SiO$_4$ | 24 | 824 | 992 |
| 73 | 23 | 35 | 36 | 71 | 6 | 0 | SiO$_2$ | <u>5</u> | 736 | 1026 |
| 74 | 100 | 0 | 0 | <u>0</u> | 0 | 0 | SiO$_2$, Mn$_2$SiO$_4$ | 17 | 503 | <u>682</u> |
| 75 | 82 | 12 | 4 | <u>16</u> | 2 | 0 | SiO$_2$, Mn$_2$SiO$_4$ | 26 | 592 | <u>821</u> |
| 76 | 68 | 9 | 0 | <u>9</u> | 0 | 23 | SiO$_2$, Mn$_2$SiO$_4$ | 38 | 632 | <u>824</u> |
| 77 | 26 | 23 | 48 | 71 | 3 | 0 | SiO$_2$, Mn$_2$SiO$_4$ | 66 | 719 | 1022 |
| 78 | 19 | 35 | 42 | 77 | 4 | 0 | SiO$_2$, Mn$_2$SiO$_4$ | <u>7</u> | 834 | 993 |
| 79 | 20 | 33 | 44 | 77 | 3 | 0 | SiO$_2$ | <u>93</u> | 730 | 1029 |
| 80 | 20 | 39 | 38 | 77 | 3 | 0 | SiO$_2$, Mn$_2$SiO$_4$ | 24 | 732 | 997 |
| 81 | 23 | 39 | 0 | 39 | 0 | <u>38</u> | SiO$_2$, Mn$_2$SiO$_4$ | 29 | 642 | <u>882</u> |
| 82 | 19 | 37 | 40 | 77 | 2 | 2 | SiO$_2$, Mn$_2$SiO$_4$ | <u>3</u> | 762 | 1004 |
| 83 | 34 | 27 | 36 | 63 | 3 | 0 | SiO$_2$, Mn$_2$SiO$_4$ | 26 | 602 | 1021 |
| 84 | 32 | 29 | 37 | 66 | 2 | 0 | SiO$_2$ | <u>100</u> | 628 | 1034 |
| 85 | 20 | 32 | 46 | 78 | 2 | 0 | SiO$_2$, Mn$_2$SiO$_4$ | 32 | 722 | 998 |
| 86 | 22 | 32 | 45 | 77 | 1 | 0 | SiO$_2$, Mn$_2$SiO$_4$ | 26 | 735 | 1035 |
| 87 | 18 | 7 | 75 | 82 | 0 | 0 | SiO$_2$, Mn$_2$SiO$_4$ | 24 | 798 | 1004 |
| 88 | 23 | 26 | 46 | 72 | 5 | 0 | SiO$_2$ | <u>7</u> | 726 | 1056 |
| 89 | 100 | 0 | 0 | <u>0</u> | 0 | 0 | SiO$_2$ | 13 | 546 | <u>723</u> |
| 90 | 90 | 6 | 3 | <u>9</u> | 1 | 0 | SiO$_2$ | 23 | 573 | <u>792</u> |
| 91 | 25 | 32 | 0 | 32 | 3 | <u>40</u> | SiO$_2$, Mn$_2$SiO$_4$ | 22 | 521 | <u>953</u> |
| 92 | 27 | 32 | 39 | 71 | 2 | 0 | SiO$_2$, Mn$_2$SiO$_4$ | 21 | 699 | 1011 |
| 93 | 22 | 35 | 42 | 77 | 1 | 0 | SiO$_2$, Mn$_2$SiO$_4$ | 8 | 586 | 997 |
| 94 | 23 | 26 | 47 | 73 | 4 | 0 | SiO$_2$, Mn$_2$SiO$_4$ | 19 | 725 | 985 |
| 95 | 27 | 39 | 0 | 39 | 0 | <u>34</u> | SiO$_2$, Mn$_2$SiO$_4$ | 20 | 635 | <u>920</u> |
| 96 | 23 | 28 | 49 | 77 | 0 | 0 | SiO$_2$, Mn$_2$SiO$_4$ | <u>4</u> | 699 | 982 |
| 97 | 24 | 27 | 48 | 75 | 1 | 0 | SiO$_2$, Mn$_2$SiO$_4$ | 28 | 705 | 1039 |
| 98 | 27 | 29 | 7 | 36 | 0 | <u>37</u> | SiO$_2$ | <u>96</u> | 648 | <u>899</u> |
| 99 | 16 | 45 | 36 | 81 | 3 | 0 | SiO$_2$, Mn$_2$SiO$_4$, Al$_2$O$_3$ | 35 | 806 | 1223 |
| 100 | 15 | 12 | 73 | 85 | 0 | 0 | SiO$_2$, Mn$_2$SiO$_4$ | 29 | 908 | 1195 |
| 101 | 12 | 47 | 38 | 85 | 3 | 0 | SiO$_2$, Mn$_2$SiO$_4$ | 34 | 840 | 1228 |
| 102 | 14 | 49 | 31 | 80 | 6 | 0 | SiO$_2$, Al$_2$O$_3$ | 6 | 865 | 1265 |
| 103 | 100 | 0 | 0 | <u>0</u> | 0 | 0 | SiO$_2$, Mn$_2$SiO$_4$, Al$_2$O$_3$ | 32 | 572 | <u>788</u> |
| 104 | 56 | 0 | 0 | <u>0</u> | 0 | <u>44</u> | SiO$_2$, Mn$_2$SiO$_4$, Al$_2$O$_3$ | 30 | 596 | <u>836</u> |
| 105 | 36 | 22 | 42 | 63 | 1 | 0 | SiO$_2$, Mn$_2$SiO$_4$, Al$_2$O$_3$ | 29 | 832 | 1221 |
| 106 | 12 | 48 | 37 | 85 | 3 | 0 | SiO$_2$, Mn$_2$SiO$_4$, Al$_2$O$_3$ | 27 | 826 | 1208 |
| 107 | 13 | 42 | 0 | 42 | 0 | <u>45</u> | SiO$_2$, Mn$_2$SiO$_4$, Al$_2$O$_3$ | 26 | 851 | <u>924</u> |
| 108 | 14 | 45 | 39 | 84 | 2 | 0 | SiO$_2$, Mn$_2$SiO$_4$ | 23 | 845 | 1224 |
| 109 | 12 | 40 | 47 | 87 | 1 | 0 | SiO$_2$, Mn$_2$SiO$_4$ | 27 | 836 | 1236 |
| 110 | 42 | 22 | 33 | 55 | 3 | 0 | SiO$_2$, Mn$_2$SiO$_4$ | 29 | 848 | 1218 |
| 111 | 15 | 46 | 35 | 81 | 4 | 0 | SiO$_2$, Mn$_2$SiO$_4$ | 30 | 842 | 1224 |
| 112 | 11 | 46 | 40 | 86 | 3 | 0 | SiO$_2$, Mn$_2$SiO$_4$ | 42 | 934 | 1354 |
| 113 | 7 | 45 | 46 | 91 | 2 | 0 | SiO$_2$, Mn$_2$SiO$_4$ | 37 | 1095 | 1325 |
| 114 | 5 | 13 | 82 | 95 | 0 | 0 | SiO$_2$, Mn$_2$SiO$_4$ | 33 | 905 | 1345 |
| 115 | 6 | 48 | 39 | 87 | 7 | 0 | SiO$_2$, Mn$_2$SiO$_4$ | <u>7</u> | 922 | 1355 |
| 116 | 100 | 0 | 0 | <u>0</u> | 0 | 0 | SiO$_2$, Mn$_2$SiO$_4$ | 29 | 546 | <u>824</u> |
| 117 | 48 | 15 | 0 | <u>15</u> | 0 | <u>37</u> | SiO$_2$, Mn$_2$SiO$_4$ | 37 | 642 | <u>962</u> |
| 118 | 43 | 19 | 35 | 54 | 3 | 0 | SiO$_2$, Mn$_2$SiO$_4$ | 33 | 895 | 1342 |
| 119 | 5 | 45 | 45 | 90 | 5 | 0 | SiO$_2$, Mn$_2$SiO$_4$ | <u>4</u> | 942 | 1306 |
| 120 | 3 | 43 | 53 | 96 | 1 | 0 | SiO$_2$, Mn$_2$SiO$_4$ | 35 | 925 | 1324 |
| 121 | 15 | 38 | 0 | 38 | 0 | <u>47</u> | SiO$_2$, Mn$_2$SiO$_4$ | 38 | 756 | <u>964</u> |
| 122 | 5 | 46 | 49 | 95 | 0 | 0 | SiO$_2$, Mn$_2$SiO$_4$ | <u>8</u> | 896 | 1301 |
| 123 | 5 | 39 | 53 | 92 | 3 | 0 | SiO$_2$, Mn$_2$SiO$_4$ | 36 | 926 | 1350 |
| 124 | 41 | 20 | 37 | 57 | 2 | 0 | SiO$_2$, Mn$_2$SiO$_4$ | 34 | 895 | 1346 |
| 125 | 3 | 45 | 48 | 93 | 4 | 0 | SiO$_2$, Mn$_2$SiO$_4$ | 29 | 908 | 1339 |
| 126 | 42 | 19 | 38 | 57 | 1 | 0 | SiO$_2$, Mn$_2$SiO$_4$ | 49 | 954 | 1089 |

TABLE 3-2-continued

| STEEL NO. | F*¹/% | B/% | M/% | B + M/% | γR/% | P/% | OXIDES IN PLATED LAYER | PROJECTED AREA RATIO/% | YP/ MPa | TS/ MPa |
|---|---|---|---|---|---|---|---|---|---|---|
| 127 | 48 | 16 | 36 | 52 | 0 | 0 | $SiO_2$ | 95 | 975 | 1068 |
| 128 | 0 | 29 | 52 | 81 | 19 | 0 | $SiO_2$, $Mn_2SiO_4$ | 33 | 1208 | 1725 |
| 129 | 93 | 1 | 0 | 1 | 0 | 6 | $SiO_2$, $Mn_2SiO_4$ | 12 | 256 | 389 |
| 130 | 24 | 23 | 48 | 69 | 7 | 0 | $SiO_2$, $Mn_2SiO_4$ | 23 | 1192 | 1436 |
| 131 | 91 | 9 | 0 | 9 | 0 | 0 | $SiO_2$, $Mn_2SiO_4$ | 26 | 355 | 576 |
| 132 | 57 | 22 | 6 | 28 | 15 | 0 | $SiO_2$, $Mn_2SiO_4$ | 27 | 675 | 1186 |
| 133 | 84 | 5 | 0 | 5 | 0 | 11 | $SiO_2$, $Mn_2SiO_4$ | 23 | 345 | 562 |
| 134 | 49 | 13 | 36 | 49 | 2 | 0 | $SiO_2$, $Mn_2SiO_4$ | 29 | 658 | 1234 |
| 135 | 50 | 13 | 35 | 48 | 2 | 0 | $SiO_2$, $Mn_2SiO_4$ | 24 | 699 | 1209 |
| 136 | 78 | 0 | 17 | 17 | 5 | 0 | $SiO_2$, $Mn_2SiO_4$ | 27 | 675 | 926 |
| 137 | 52 | 15 | 32 | 47 | 1 | 0 | $SiO_2$, $Mn_2SiO_4$, $Al_2O_3$ | 68 | 738 | 1196 |
| 138 | 51 | 14 | 33 | 47 | 2 | 0 | $SiO_2$, $Mn_2SiO_4$ | 27 | 709 | 1204 |
| 139 | 78 | 12 | 10 | 22 | 0 | 0 | $SiO_2$, $Mn_2SiO_4$ | 26 | 1124 | 1346 |
| 140 | 33 | 23 | 43 | 66 | 1 | 0 | $SiO_2$, $Mn_2SiO_4$ | 28 | 681 | 1318 |
| 141 | 0 | 26 | 73 | 99 | 1 | 0 | $SiO_2$, $Mn_2SiO_4$ | 25 | 1025 | 1421 |
| 142 | 94 | 0 | 6 | 6 | 0 | 0 | $SiO_2$, $Mn_2SiO_4$ | 29 | 268 | 469 |

TABLE 3-3

| STEEL NO. | EL./% | TS × EI/ MPa × % | HOLE EX- PAND- ABILITY (λ)/% | TS × λ/ MPa · % | DE- LAYED FRAC- TURE RESIS- TANCE | NON- PLATING | Fe %/ mass % | POWDERING RESISTANCE | STEEL SHEET | NOTE |
|---|---|---|---|---|---|---|---|---|---|---|
| 1 | 16 | 16368 | 28 | 28644 | GOOD | GOOD | 1.8 | GOOD | GI | STEEL OF PRESENT INVENTION |
| 2 | 17 | 17527 | 42 | 43302 | GOOD | GOOD | 1.6 | GOOD | GI | STEEL OF PRESENT INVENTION |
| 3 | 16 | 16464 | 23 | 23667 | BAD | GOOD | 1.9 | GOOD | GI | STEEL OF COMPARATIVE EXAMPLE |
| 4 | 15 | 10890 | 25 | 18150 | GOOD | GOOD | 2.2 | GOOD | GI | STEEL OF COMPARATIVE EXAMPLE |
| 5 | 14 | 12152 | 41 | 35588 | GOOD | GOOD | 2.1 | GOOD | GI | STEEL OF COMPARATIVE EXAMPLE |
| 6 | 14 | 11676 | 43 | 35862 | GOOD | GOOD | 2.0 | GOOD | GI | STEEL OF COMPARATIVE EXAMPLE |
| 7 | 16 | 16400 | 29 | 29725 | GOOD | BAD | 0.2 | GOOD | GI | STEEL OF COMPARATIVE EXAMPLE |
| 8 | 16 | 16544 | 30 | 31020 | BAD | GOOD | 1.3 | GOOD | GI | STEEL OF COMPARATIVE EXAMPLE |
| 9 | 17 | 16847 | 24 | 23784 | GOOD | GOOD | 11.2 | GOOD | GA | STEEL OF PRESENT INVENTION |
| 10 | 15 | 12525 | 46 | 38410 | GOOD | GOOD | 17.9 | BAD | GA | STEEL OF COMPARATIVE EXAMPLE |
| 11 | 12 | 12456 | 28 | 29064 | BAD | GOOD | 12.3 | GOOD | GA | STEEL OF COMPARATIVE EXAMPLE |
| 12 | *4 | *4 | *4 | *4 | *4 | *4 | *4 | *4 | *4 | STEEL OF COMPARATIVE EXAMPLE |
| 13 | 16 | 16432 | 30 | 30810 | GOOD | BAD | 11.8 | GOOD | GA | STEEL OF COMPARATIVE EXAMPLE |
| 14 | 15 | 16275 | 26 | 28210 | GOOD | GOOD | 1.8 | GOOD | GI | STEEL OF PRESENT INVENTION |
| 15 | 15 | 16170 | 28 | 30184 | GOOD | BAD | 0.4 | GOOD | GI | STEEL OF COMPARATIVE EXAMPLE |
| 16 | 16 | 16160 | 29 | 29290 | GOOD | GOOD | 1.6 | GOOD | GI | STEEL OF PRESENT INVENTION |
| 17 | 17 | 16915 | 45 | 44775 | GOOD | GOOD | 1.9 | GOOD | GI | STEEL OF PRESENT INVENTION |
| 18 | 16 | 16208 | 24 | 24312 | BAD | GOOD | 2.1 | GOOD | GI | STEEL OF COMPARATIVE EXAMPLE |
| 19 | 15 | 12345 | 38 | 31274 | GOOD | GOOD | 2.2 | GOOD | GI | STEEL OF COMPARATIVE EXAMPLE |
| 20 | 16 | 13344 | 26 | 21684 | GOOD | GOOD | 2.3 | GOOD | GI | STEEL OF COMPARATIVE EXAMPLE |
| 21 | 16 | 13696 | 28 | 23968 | GOOD | GOOD | 4.2 | GOOD | GI | STEEL OF COMPARATIVE EXAMPLE |
| 22 | 16 | 16144 | 23 | 23207 | GOOD | BAD | 1.6 | GOOD | GI | STEEL OF COMPARATIVE EXAMPLE |
| 23 | 16 | 16032 | 26 | 26052 | GOOD | BAD | 1.3 | GOOD | GI | STEEL OF COMPARATIVE EXAMPLE |
| 24 | 17 | 17289 | 28 | 28476 | GOOD | GOOD | 10.6 | GOOD | GA | STEEL OF PRESENT INVENTION |
| 25 | 15 | 13290 | 35 | 31010 | GOOD | GOOD | 18.9 | BAD | GA | STEEL OF COMPARATIVE EXAMPLE |
| 26 | 14 | 14028 | 24 | 24048 | BAD | GOOD | 10.1 | GOOD | GA | STEEL OF COMPARATIVE EXAMPLE |
| 27 | *4 | *4 | *4 | *4 | *4 | *4 | *4 | *4 | *4 | STEEL OF COMPARATIVE EXAMPLE |
| 28 | 16 | 15952 | 27 | 26919 | GOOD | BAD | 12.6 | GOOD | GA | STEEL OF COMPARATIVE EXAMPLE |
| 29 | 17 | 16966 | 25 | 24950 | GOOD | GOOD | 1.5 | GOOD | GI | STEEL OF PRESENT INVENTION |
| 30 | 14 | 17122 | 21 | 25683 | GOOD | GOOD | 1.9 | GOOD | GI | STEEL OF PRESENT INVENTION |
| 31 | 15 | 17760 | 50 | 59200 | GOOD | GOOD | 2.1 | GOOD | GI | STEEL OF PRESENT INVENTION |
| 32 | 14 | 17346 | 24 | 29736 | BAD | GOOD | 1.6 | GOOD | GI | STEEL OF COMPARATIVE EXAMPLE |
| 33 | 11 | 9152 | 37 | 30784 | GOOD | GOOD | 1.7 | GOOD | GI | STEEL OF COMPARATIVE EXAMPLE |
| 34 | 12 | 10332 | 36 | 30996 | GOOD | GOOD | 2.2 | GOOD | GI | STEEL OF COMPARATIVE EXAMPLE |
| 35 | 13 | 11336 | 38 | 33136 | GOOD | GOOD | 2.5 | GOOD | GI | STEEL OF COMPARATIVE EXAMPLE |
| 36 | 15 | 18390 | 24 | 29424 | GOOD | BAD | 1.4 | GOOD | GI | STEEL OF COMPARATIVE EXAMPLE |
| 37 | 13 | 12038 | 57 | 52782 | GOOD | GOOD | 1.9 | GOOD | GA | STEEL OF COMPARATIVE EXAMPLE |
| 38 | 14 | 16646 | 25 | 29725 | GOOD | GOOD | 9.9 | GOOD | GA | STEEL OF PRESENT INVENTION |
| 39 | 12 | 11256 | 19 | 17822 | GOOD | GOOD | 18.2 | BAD | GA | STEEL OF COMPARATIVE EXAMPLE |
| 40 | 14 | 16926 | 24 | 29016 | BAD | GOOD | 8.3 | GOOD | GA | STEEL OF COMPARATIVE EXAMPLE |
| 41 | 13 | 11338 | 21 | 18312 | GOOD | BAD | 18.9 | BAD | GA | STEEL OF COMPARATIVE EXAMPLE |
| 42 | 14 | 16618 | 26 | 30862 | GOOD | GOOD | 1.1 | GOOD | GI | STEEL OF PRESENT INVENTION |
| 43 | 14 | 16926 | 23 | 27807 | GOOD | GOOD | 1.6 | GOOD | GI | STEEL OF PRESENT INVENTION |
| 44 | 14 | 16996 | 20 | 24280 | GOOD | GOOD | 1.7 | GOOD | GI | STEEL OF PRESENT INVENTION |
| 45 | 15 | 18030 | 23 | 27646 | GOOD | GOOD | 1.5 | GOOD | GI | STEEL OF PRESENT INVENTION |
| 46 | 14 | 17234 | 48 | 59088 | GOOD | GOOD | 2.2 | GOOD | GI | STEEL OF PRESENT INVENTION |
| 47 | 15 | 18060 | 24 | 28896 | BAD | GOOD | 1.4 | GOOD | GI | STEEL OF COMPARATIVE EXAMPLE |
| 48 | 12 | 10668 | 32 | 28448 | GOOD | GOOD | 1.6 | GOOD | GI | STEEL OF COMPARATIVE EXAMPLE |

TABLE 3-3-continued

| STEEL NO. | El./% | TS × El/ MPa × % | HOLE EX- PAND- ABILITY (λ)/% | TS × λ/ MPa · % | DE- LAYED FRAC- TURE RESIS- TANCE | NON- PLATING | Fe %/ mass % | POWDERING RESISTANCE | STEEL SHEET | NOTE |
|---|---|---|---|---|---|---|---|---|---|---|
| 49 | 13 | 12142 | 19 | 17746 | GOOD | GOOD | 1.3 | GOOD | GI | STEEL OF COMPARATIVE EXAMPLE |
| 50 | 14 | 12894 | 22 | 20262 | GOOD | GOOD | 2.1 | GOOD | GI | STEEL OF COMPARATIVE EXAMPLE |
| 51 | 14 | 17136 | 30 | 36720 | GOOD | BAD | 1.2 | GOOD | GI | STEEL OF COMPARATIVE EXAMPLE |
| 52 | 14 | 16982 | 22 | 26686 | GOOD | GOOD | 11.3 | GOOD | GA | STEEL OF PRESENT INVENTION |
| 53 | 11 | 9812 | 37 | 33004 | GOOD | GOOD | 17.9 | BAD | GA | STEEL OF COMPARATIVE EXAMPLE |
| 54 | 13 | 16029 | 23 | 28359 | BAD | GOOD | 12.9 | GOOD | GA | STEEL OF COMPARATIVE EXAMPLE |
| 55 | *4 | *4 | *4 | *4 | *4 | *4 | *4 | *4 | | STEEL OF COMPARATIVE EXAMPLE |
| 56 | 14 | 17136 | 26 | 31824 | GOOD | GOOD | 2.1 | GOOD | GI | STEEL OF PRESENT INVENTION |
| 57 | 14 | 17066 | 24 | 29256 | GOOD | GOOD | 1.6 | GOOD | GI | STEEL OF PRESENT INVENTION |
| 58 | 15 | 18030 | 23 | 27646 | GOOD | GOOD | 1.4 | GOOD | GI | STEEL OF PRESENT INVENTION |
| 59 | 13 | 16042 | 24 | 29616 | GOOD | GOOD | 2.0 | GOOD | GI | STEEL OF PRESENT INVENTION |
| 60 | 14 | 16562 | 22 | 26026 | GOOD | GOOD | 1.6 | GOOD | GI | STEEL OF PRESENT INVENTION |
| 61 | 12 | 16248 | 24 | 32496 | GOOD | GOOD | 1.9 | GOOD | GI | STEEL OF PRESENT INVENTION |
| 62 | 13 | 17303 | 23 | 30613 | GOOD | GOOD | 2.1 | GOOD | GI | STEEL OF PRESENT INVENTION |
| 63 | 12 | 16428 | 19 | 26011 | BAD | GOOD | 1.4 | GOOD | GI | STEEL OF COMPARATIVE EXAMPLE |
| 64 | 12 | 10584 | 36 | 31752 | GOOD | GOOD | 1.5 | GOOD | GI | STEEL OF COMPARATIVE EXAMPLE |
| 65 | 13 | 12506 | 21 | 20202 | GOOD | GOOD | 1.8 | GOOD | GI | STEEL OF COMPARATIVE EXAMPLE |
| 66 | 12 | 16224 | 24 | 32448 | GOOD | BAD | 1.2 | GOOD | GI | STEEL OF COMPARATIVE EXAMPLE |
| 67 | 13 | 17212 | 20 | 26480 | GOOD | GOOD | 9.4 | GOOD | GA | STEEL OF PRESENT INVENTION |
| 68 | 11 | 10153 | 22 | 20306 | GOOD | GOOD | 16.9 | BAD | GA | STEEL OF COMPARATIVE EXAMPLE |
| 69 | 12 | 16260 | 17 | 23035 | BAD | BAD | 12.9 | GOOD | GA | STEEL OF COMPARATIVE EXAMPLE |
| 70 | 13 | 17446 | 25 | 33550 | GOOD | GOOD | 1.4 | GOOD | GI | STEEL OF PRESENT INVENTION |

TABLE 3-4

| STEEL NO. | El./% | TS × El/ MPa × % | HOLE EX- PAND- ABILITY (λ)/% | TS × λ/ MPa · % | DE- LAYED FRAC- TURE RESIS- TANCE | NON- PLATING | Fe %/ mass % | POWDERING RESISTANCE | STEEL SHEET | NOTE |
|---|---|---|---|---|---|---|---|---|---|---|
| 71 | 12 | 12360 | 54 | 55620 | GOOD | GOOD | 2.1 | GOOD | GI | STEEL OF PRESENT INVENTION |
| 72 | 11 | 10912 | 62 | 61504 | GOOD | GOOD | 1.7 | GOOD | GI | STEEL OF PRESENT INVENTION |
| 73 | 7 | 7182 | 52 | 53352 | BAD | GOOD | 3.3 | GOOD | GI | STEEL OF COMPARATIVE EXAMPLE |
| 74 | 21 | 14322 | 78 | 53196 | GOOD | GOOD | 2.2 | GOOD | GI | STEEL OF COMPARATIVE EXAMPLE |
| 75 | 19 | 15599 | 36 | 29556 | GOOD | GOOD | 2.1 | GOOD | GI | STEEL OF COMPARATIVE EXAMPLE |
| 76 | 16 | 13184 | 48 | 39552 | GOOD | GOOD | 2.1 | GOOD | GI | STEEL OF COMPARATIVE EXAMPLE |
| 77 | 11 | 11242 | 56 | 57232 | GOOD | BAD | 1.1 | GOOD | GI | STEEL OF COMPARATIVE EXAMPLE |
| 78 | 11 | 10923 | 70 | 69510 | BAD | GOOD | 1.4 | GOOD | GI | STEEL OF COMPARATIVE EXAMPLE |
| 79 | 11 | 11319 | 51 | 52479 | GOOD | BAD | 0.3 | GOOD | GI | STEEL OF COMPARATIVE EXAMPLE |
| 80 | 12 | 11964 | 56 | 55832 | GOOD | GOOD | 10.8 | GOOD | GA | STEEL OF PRESENT INVENTION |
| 81 | 16 | 14112 | 33 | 29106 | GOOD | GOOD | 18.2 | BAD | GA | STEEL OF COMPARATIVE EXAMPLE |
| 82 | 10 | 10040 | 50 | 50200 | BAD | BAD | 12.2 | GOOD | GA | STEEL OF COMPARATIVE EXAMPLE |
| 83 | 16 | 16336 | 43 | 43903 | GOOD | GOOD | 2.1 | GOOD | GI | STEEL OF PRESENT INVENTION |
| 84 | 15 | 15510 | 40 | 41360 | GOOD | BAD | 0.5 | GOOD | GI | STEEL OF COMPARATIVE EXAMPLE |
| 85 | 12 | 11976 | 64 | 63872 | GOOD | GOOD | 1.9 | GOOD | GI | STEEL OF PRESENT INVENTION |
| 86 | 13 | 13455 | 54 | 55890 | GOOD | GOOD | 1.3 | GOOD | GI | STEEL OF PRESENT INVENTION |
| 87 | 12 | 12048 | 66 | 66264 | GOOD | GOOD | 1.7 | GOOD | GI | STEEL OF PRESENT INVENTION |
| 88 | 9 | 9504 | 57 | 60192 | BAD | GOOD | 2.2 | GOOD | GI | STEEL OF COMPARATIVE EXAMPLE |
| 89 | 16 | 11568 | 68 | 49164 | GOOD | GOOD | 1.6 | GOOD | GI | STEEL OF COMPARATIVE EXAMPLE |
| 90 | 14 | 11088 | 32 | 25344 | GOOD | GOOD | 1.5 | GOOD | GI | STEEL OF COMPARATIVE EXAMPLE |
| 91 | 8 | 7624 | 26 | 24778 | GOOD | GOOD | 1.1 | GOOD | GI | STEEL OF COMPARATIVE EXAMPLE |
| 92 | 15 | 15165 | 55 | 55605 | GOOD | BAD | 0.9 | GOOD | GI | STEEL OF COMPARATIVE EXAMPLE |
| 93 | 11 | 10967 | 48 | 47856 | BAD | GOOD | 1.2 | GOOD | GI | STEEL OF COMPARATIVE EXAMPLE |
| 94 | 13 | 12805 | 62 | 61070 | GOOD | GOOD | 11.3 | GOOD | GA | STEEL OF PRESENT INVENTION |
| 95 | 12 | 11040 | 32 | 29440 | GOOD | GOOD | 18.9 | BAD | GA | STEEL OF COMPARATIVE EXAMPLE |
| 96 | 12 | 11784 | 58 | 56956 | BAD | GOOD | 13.1 | GOOD | GA | STEEL OF COMPARATIVE EXAMPLE |
| 97 | 8 | 8312 | 24 | 24936 | BAD | GOOD | 12.8 | GOOD | GA | STEEL OF COMPARATIVE EXAMPLE |
| 98 | 13 | 11687 | 23 | 20677 | GOOD | BAD | 19.3 | BAD | GA | STEEL OF COMPARATIVE EXAMPLE |
| 99 | 12 | 14676 | 42 | 51366 | GOOD | GOOD | 1.7 | GOOD | GI | STEEL OF COMPARATIVE EXAMPLE |
| 100 | 13 | 15535 | 67 | 80065 | GOOD | GOOD | 2.1 | GOOD | GI | STEEL OF PRESENT INVENTION |
| 101 | 13 | 15964 | 56 | 68768 | GOOD | GOOD | 2.2 | GOOD | GI | STEEL OF PRESENT INVENTION |
| 102 | 7 | 8855 | 58 | 73370 | BAD | GOOD | 1.9 | GOOD | GI | STEEL OF COMPARATIVE EXAMPLE |
| 103 | 14 | 10752 | 61 | 46848 | GOOD | GOOD | 2.0 | GOOD | GI | STEEL OF COMPARATIVE EXAMPLE |
| 104 | 13 | 10868 | 28 | 23408 | GOOD | GOOD | 1.6 | GOOD | GI | STEEL OF COMPARATIVE EXAMPLE |
| 105 | 12 | 14652 | 52 | 63492 | GOOD | BAD | 1.8 | GOOD | GI | STEEL OF COMPARATIVE EXAMPLE |
| 106 | 11 | 13288 | 55 | 66440 | GOOD | GOOD | 9.6 | GOOD | GA | STEEL OF PRESENT INVENTION |
| 107 | 13 | 12012 | 22 | 20328 | GOOD | GOOD | 17.6 | BAD | GA | STEEL OF COMPARATIVE EXAMPLE |
| 108 | 13 | 15912 | 54 | 66096 | GOOD | GOOD | 1.6 | GOOD | GI | STEEL OF PRESENT INVENTION |

TABLE 3-4-continued

| STEEL NO. | El./% | TS × El/ MPa × % | HOLE EXPAND- ABILITY (λ)/% | TS × λ/ MPa · % | DELAYED FRACTURE RESIS- TANCE | NON- PLATING | Fe %/ mass % | POWDERING RESISTANCE | STEEL SHEET | NOTE |
|---|---|---|---|---|---|---|---|---|---|---|
| 109 | 14 | 17304 | 60 | 74160 | GOOD | GOOD | 2.1 | GOOD | GI | STEEL OF PRESENT INVENTION |
| 110 | 12 | 14616 | 51 | 62118 | GOOD | GOOD | 1.7 | GOOD | GI | STEEL OF PRESENT INVENTION |
| 111 | 13 | 15912 | 54 | 66096 | GOOD | GOOD | 1.4 | GOOD | GI | STEEL OF PRESENT INVENTION |
| 112 | 12 | 16248 | 48 | 64992 | GOOD | GOOD | 1.6 | GOOD | GI | STEEL OF PRESENT INVENTION |
| 113 | 13 | 17225 | 57 | 75525 | GOOD | GOOD | 1.9 | GOOD | GI | STEEL OF PRESENT INVENTION |
| 114 | 12 | 16140 | 42 | 56490 | GOOD | GOOD | 2.3 | GOOD | GI | STEEL OF PRESENT INVENTION |
| 115 | 8 | 10840 | 39 | 52845 | BAD | GOOD | 2.4 | GOOD | GI | STEEL OF COMPARATIVE EXAMPLE |
| 116 | 14 | 11536 | 42 | 34608 | GOOD | GOOD | 1.9 | GOOD | GI | STEEL OF COMPARATIVE EXAMPLE |
| 117 | 11 | 10582 | 19 | 18278 | GOOD | GOOD | 1.5 | GOOD | GI | STEEL OF COMPARATIVE EXAMPLE |
| 118 | 12 | 16104 | 49 | 65758 | GOOD | BAD | 1.8 | GOOD | GI | STEEL OF COMPARATIVE EXAMPLE |
| 119 | 11 | 14366 | 40 | 52240 | BAD | GOOD | 1.3 | GOOD | GI | STEEL OF COMPARATIVE EXAMPLE |
| 120 | 11 | 14564 | 50 | 66200 | GOOD | GOOD | 9.8 | GOOD | GA | STEEL OF PRESENT INVENTION |
| 121 | 12 | 11568 | 18 | 17352 | GOOD | GOOD | 17.6 | BAD | GA | STEEL OF COMPARATIVE EXAMPLE |
| 122 | 10 | 13010 | 36 | 46836 | BAD | BAD | 11.9 | GOOD | GA | STEEL OF COMPARATIVE EXAMPLE |
| 123 | 11 | 14850 | 53 | 71550 | GOOD | GOOD | 1.6 | GOOD | GI | STEEL OF PRESENT INVENTION |
| 124 | 10 | 13460 | 42 | 56532 | GOOD | GOOD | 2.3 | GOOD | GI | STEEL OF PRESENT INVENTION |
| 125 | 14 | 18746 | 48 | 64272 | GOOD | GOOD | 2.5 | GOOD | GI | STEEL OF PRESENT INVENTION |
| 126 | 18 | 19602 | 59 | 64251 | GOOD | GOOD | 10.7 | GOOD | GA | STEEL OF PRESENT INVENTION |
| 127 | 18 | 19224 | 67 | 71556 | GOOD | BAD | 7.9 | GOOD | GA | STEEL OF COMPARATIVE EXAMPLE |
| 128 | 4 | 6900 | 30 | 51750 | BAD | GOOD | 1.4 | GOOD | GI | STEEL OF COMPARATIVE EXAMPLE |
| 129 | 32 | 12448 | 102 | 39678 | GOOD | GOOD | 1.9 | GOOD | GI | STEEL OF COMPARATIVE EXAMPLE |
| 130 | 3 | 4308 | 5 | 7180 | BAD | GOOD | 2.2 | GOOD | GI | STEEL OF COMPARATIVE EXAMPLE |
| 131 | 26 | 14976 | 59 | 33984 | GOOD | GOOD | 2 | GOOD | GI | STEEL OF COMPARATIVE EXAMPLE |
| 132 | 15 | 17790 | 13 | 15418 | BAD | GOOD | 2.5 | GOOD | GI | STEEL OF COMPARATIVE EXAMPLE |
| 133 | 27 | 15174 | 56 | 31472 | GOOD | GOOD | 2.4 | GOOD | GI | STEEL OF COMPARATIVE EXAMPLE |
| 134 | 12 | 14808 | 10 | 12340 | BAD | GOOD | 1.8 | GOOD | GI | STEEL OF COMPARATIVE EXAMPLE |
| 135 | 10 | 12090 | 8 | 9672 | BAD | GOOD | 1.2 | GOOD | GI | STEEL OF COMPARATIVE EXAMPLE |
| 136 | 15 | 13890 | 14 | 12964 | BAD | GOOD | 0.4 | GOOD | GI | STEEL OF COMPARATIVE EXAMPLE |
| 137 | 12 | 14352 | 9 | 10764 | BAD | GOOD | 1.2 | GOOD | GI | STEEL OF COMPARATIVE EXAMPLE |
| 138 | 11 | 13244 | 9 | 10836 | BAD | GOOD | 1.9 | GOOD | GI | STEEL OF COMPARATIVE EXAMPLE |
| 139 | 3 | 4038 | 9 | 12114 | BAD | GOOD | 0.9 | GOOD | GI | STEEL OF COMPARATIVE EXAMPLE |
| 140 | 13 | 17134 | 12 | 15816 | BAD | GOOD | 1.2 | GOOD | GI | STEEL OF COMPARATIVE EXAMPLE |
| 141 | 5 | 7105 | 3 | 4263 | BAD | GOOD | 0.7 | GOOD | GI | STEEL OF COMPARATIVE EXAMPLE |
| 142 | 41 | 19229 | 92 | 43148 | GOOD | GOOD | 11.9 | GOOD | GA | STEEL OF COMPARATIVE EXAMPLE |

INDUSTRIAL APPLICABILITY

The present invention provides a high-strength hot-dip galvanized steel sheet which is suitable for a structural member, a reinforcing member, and a suspension member for a vehicle, has the tensile strength of equal to or greater than 980 MPa, and has excellent delayed fracture resistance, at low cost. Accordingly, great contribution to automobile lightening can be expected and the industrial effect is extremely high.

The invention claimed is:

1. A hot-dip galvanized steel sheet comprising:
a steel sheet; and
a plated layer on a surface of the steel sheet,
wherein the steel sheet contains, by mass %,
C: equal to or more than 0.05% and less than 0.40%,
Si: 0.5% to 3.0%,
Mn: 1.5% to 3.0%,
O: limited to 0.006% or less,
P: limited to 0.4% or less,
S: limited to 0.01% or less,
Al: limited to 2.0% or less,
N: limited to 0.01% or less, and
the remainder including Fe and unavoidable impurities,
wherein a microstructure of the steel sheet contains, by volume fraction, equal to or more than 20% and equal to or less than 99% in total of one or two of a martensite and a bainite, and
a residual structure including a ferrite, and one or two of a residual austenite of less than 8% by volume fraction, and a pearlite of equal to or less than 10% by volume fraction,
wherein a tensile strength of the steel sheet is equal to or greater than 980 MPa,
wherein the plated layer is a hot-dip galvanized layer which contains oxides including one or two or more of Si, Mn, and Al, contains equal to or less than 15 mass % of Fe, and the remainder including Zn, Al, and unavoidable impurities, and
wherein when a cross section including the steel sheet and the hot-dip galvanized layer is seen in a sheet thickness direction, a projected area ratio which is an area ratio obtained by dividing a length of the oxides projected to an interface between the hot-dip galvanized layer and the steel sheet by a length of the interface between the hot-dip galvanized layer and the steel sheet, is equal to or more than 19% and equal to or less than 62%.

2. A galvannealed steel sheet comprising:
a steel sheet; and
a plated layer on a surface of the steel sheet,
wherein the steel sheet contains, by mass %,
C: equal to or more than 0.05% and less than 0.40%,
Si: 0.5% to 3.0%,
Mn: 1.5% to 3.0%,
O: limited to 0.006% or less,
P: limited to 0.04% or less,
S: limited to 0.01% or less, Al: limited to 2.0% or less,
N: limited to 0.01% or less, and
the remainder including Fe and unavoidable impurities,
wherein a microstructure of the steel sheet contains,
by volume fraction, equal to or more than 20% and equal to or less than 99% in total of one or two of a martensite and a bainite, and
a residual structure including a ferrite, and one or two of a residual austenite of less than 8% by volume fraction, and a pearlite of equal to or less than 10% by volume fraction,
wherein a tensile strength of the steel sheet is equal to or greater than 980 MPa,
wherein the plated layer is a galvannealed layer which contains oxides including one or two or more of Si, Mn, and Al, contains equal to or more than 7 mass % and equal to or less than 15 mass % of Fe, and the remainder including Zn, Al, and unavoidable impurities, and
wherein when a cross section including the steel sheet and the galvannealed layer is seen in a sheet thickness direction, a projected area ratio which is an area ratio obtained by dividing a length of the oxides projected to an interface between the galvannealed layer and the steel sheet by a length of the interface between the galvannealed layer and the steel sheet, is equal to or more than 19% and equal to or less than 62%.

3. The hot-dip galvanized steel sheet according to claim 1, wherein the microstructure contains, by volume fraction, 40% to 80% of ferrite.

4. The hot-dip galvanized steel sheet according to claim 1, wherein the microstructure contains, by volume fraction, more than 60% and equal to or less than 99% of one or two of martensite and bainite.

5. The hot-dip galvanized steel sheet according to claim 1, wherein the steel sheet further contains, by mass %, one or two or more of
Cr: 0.05% to 1.0%,
Mo: 0.01% to 1.0%,
Ni: 0.05% to 1.0%,
Cu: 0.05% to 1.0%,
Nb: 0.005% to 0.3%,
Ti: 0.005% to 0.3%,
V: 0.005% to 0.5%,
B: 0.0001% to 0.01%,
Ca: 0.0005% to 0.04%,
Mg: 0.0005% to 0.04%,
REM: 0.0005% to 0.04%.

6. A manufacturing method of the hot-dip galvanized steel sheet of claim 1, the method comprising:
casting a molten steel having the composition of the steel sheet to obtain a steel;
heating the steel to a first temperature range of 1100° C. to lower than 1300° C., directly or after cooling once;
completing a hot rolling of the steel at a temperature equal to or higher than an Ar3 transformation point;
coiling the steel in a second temperature range of 300° C. to 700° C.;
pickling the steel;
performing cold rolling of the steel with a cumulative rolling reduction of 40% to 80% using a cold rolling mill including a work roll having a roll diameter of 200 mm to 1400 mm;
retaining the steel in a third temperature range of 550° C. to 750° C. for 20 seconds to 2000 seconds during heating the steel to an annealing temperature, when the steel passes through a continuous galvanizing line;
maintaining the steel in a fourth temperature range of 750° C. to 900° C. for 10 seconds to 1000 seconds, in an $N_2$ atmosphere in which an $H_2$ concentration is equal to or less than 20% and a dew point is equal to or higher than −20° C., while performing an annealing;
performing a first cooling of cooling the steel to a fifth temperature range of 500° C. to 750° C. at an average cooling rate of 1° C./sec to 200° C./sec;
performing a second cooling of cooling the steel to a sixth temperature range between a temperature which is lower than a hot dip galvanizing bath temperature by 40° C. and a temperature which is higher than the hot dip galvanizing bath temperature by 50° C., at an average cooling rate which is 1° C./sec to 200° C./sec and is faster than the average cooling rate of the first cooling;
galvanizing the steel by immersing the steel in a hot dip galvanizing bath which flows at a flow velocity of 10 m/min to 50 m/min after setting a plating bath immersion sheet temperature which is a temperature when immersing the steel in the hot dip galvanizing bath, as the sixth temperature range; and
cooling the steel to a temperature equal to or lower than 40° C.

7. A manufacturing method of the galvannealed steel sheet of claim 2, the method comprising:
casting a molten steel having the composition of the steel sheet to obtain a steel;
heating the steel to a seventh temperature range of 1100° C. to lower than 1300° C., directly or after cooling once;
completing a hot rolling of the steel at a temperature equal to or higher than an Ar3 transformation point;
coiling the steel in an eighth temperature range of 300° C. to 700° C.;
pickling the steel;
performing cold rolling of the steel with a cumulative rolling reduction of 40% to 80% using a cold rolling mill including a work roll having a roll diameter of 200 mm to 1400 mm;
retaining the steel in a ninth temperature range of 550° C. to 750° C. for 20 seconds to 2000 seconds during heating the steel to an annealing temperature, when the steel passes through a continuous galvanizing line;
maintaining the steel in a tenth temperature range of 750° C. to 900° C. for 10 seconds to 1000 seconds, in an $N_2$ atmosphere in which an $H_2$ concentration is equal to or less than 20% and a dew point is equal to or higher than −20° C., while performing an annealing;
performing a third cooling of cooling the steel to an eleventh temperature range of 500° C. to 750° C. at an average cooling rate of 1° C./sec to 200° C./sec;
performing a fourth cooling of cooling the steel to a twelfth temperature range of 500° C. to 25° C., at an average cooling rate which is 1° C./sec to 200° C./sec and is faster than the average cooling rate of the third cooling;
heating the steel again to a thirteenth temperature range of 350° C. to 500° C., in a case where a cooling stop temperature of the fourth cooling is lower than 350° C.;
retaining the steel in the thirteenth temperature range;
galvanizing the steel by immersing the steel in a hot dip galvanizing bath which flows at a flow velocity of 10 m/min to 50 m/min after setting a plating bath immersion sheet temperature which is a temperature when immersing the steel in the hot dip galvanizing bath, as a fourteenth temperature range between a temperature which is lower than a hot dip galvanizing bath temperature by 40° C. and a temperature which is higher than the hot dip galvanizing bath temperature by 50° C.;

performing an alloying treatment to the steel at a fifteenth temperature range of equal to or lower than 600° C.; and cooling the steel to a temperature equal to or lower than 40° C.

8. The manufacturing method of the hot-dip galvanized steel sheet according to claim 6, wherein the annealing is performed at a temperature lower than 840° C.

9. The manufacturing method of the hot-dip galvanized steel sheet according to claim 6, wherein the annealing is performed at a temperature equal to or higher than 840° C.

10. The manufacturing method of the hot-dip galvanized steel sheet according to claim 6,
wherein the molten steel further contains, by mass %, one or two or more of
Cr: 0.05% to 1.0%,
Mo: 0.01% to 1.0%,
Ni: 0.05% to 10%,
Cu: 0.05% to 1.0%,
Nb: 0.005% to 0.3%,
Ti: 0.005% to 0.3%,
V: 0.005% to 0.5%,
B: 0.0001% to 0.01%,
Ca: 0.0005% to 0.04%,
Mg: 0.0005% to 0.04%, and
REM: 0.0005% to 0.04%.

11. The galvannealed steel sheet according to claim 2,
wherein the microstructure contains, by volume fraction, 40% to 80% of ferrite.

12. The galvannealed steel sheet according to claim 2,
wherein the microstructure contains, by volume fraction, more than 60% and equal to or less than 99% of one or two of martensite and bainite.

13. The galvannealed steel sheet according to claim 2, wherein the steel sheet further contains, by mass %, one or two or more of:
Cr: 0.05% to 1.0%,
Mo: 0.01% to 1.0%,
Ni: 0.05% to 1.0%,
Cu: 0.05% to 1.0%,
Nb: 0.005% to 0.3%,
Ti: 0.005% to 0.3%,
V: 0.005% to 0.5%,
B: 0.0001% to 0.01%,
Ca: 0.0005% to 0.04%,
Mg: 0.0005% to 0.04%, and
REM: 0.0005% to 0.04%.

14. The manufacturing method of the galvannealed steel sheet according to claim 7, wherein the annealing is performed at a temperature lower than 840° C.

15. The manufacturing method of the galvannealed steel sheet according to claim 7, wherein the annealing is performed at a temperature equal to or higher than 840° C.

16. The manufacturing method of the galvannealed steel sheet according to claim 7, wherein the molten steel further contains, by mass %, one or two or more of:
Cr: 0.05% to 1.0%,
Mo: 0.01% to 1.0%,
Ni: 0.05% to 1.0%,
Cu: 0.05% to 1.0%,
Nb: 0.005% to 0.3%,
Ti: 0.005% to 0.3%,
V: 0.005% to 0.5%,
B: 0.0001% to 0.01%,
Ca: 0.0005% to 0.04%,
Mg: 0.0005% to 0.04%, and
REM: 0.0005% to 0.04%.

* * * * *